(12) United States Patent
Packingham et al.

(10) Patent No.: US 10,845,277 B2
(45) Date of Patent: Nov. 24, 2020

(54) LIQUID TO LIQUID BIOLOGICAL PARTICLE FRACTIONATION AND CONCENTRATION

(71) Applicant: InnovaPrep LLC, Drexel, MO (US)

(72) Inventors: Zachary Allen Packingham, Drexel, MO (US); Andrew Edward Page, Smithton, MO (US); David Scott Alburty, Drexel, MO (US); Steven Dale Graham, Overland Park, KS (US); Alec Douglas Adolphson, Raymore, MO (US)

(73) Assignee: INNOVAPREP, LLC, Drexel, MO (US)

( * ) Notice: Subject to any disclaimer, the term of this patent is extended or adjusted under 35 U.S.C. 154(b) by 0 days.

(21) Appl. No.: 14/058,193

(22) Filed: Oct. 18, 2013

(65) Prior Publication Data

US 2014/0231256 A1    Aug. 21, 2014

Related U.S. Application Data

(60) Provisional application No. 61/715,451, filed on Oct. 18, 2012.

(51) Int. Cl.
*G01N 1/40*    (2006.01)
*B01D 61/20*   (2006.01)
(Continued)

(52) U.S. Cl.
CPC .............. *G01N 1/405* (2013.01); *B01D 61/20* (2013.01); *B01D 61/22* (2013.01); *B01D 63/082* (2013.01); *B01D 63/088* (2013.01);
*G01N 1/40* (2013.01); *G01N 1/4077* (2013.01); *B01D 2315/08* (2013.01); *B01D 2319/06* (2013.01); *B01D 2321/02* (2013.01); *G01N 1/4055* (2013.01); *G01N 2001/4016* (2013.01); *G01N 2001/4038* (2013.01); *G01N 2001/4088* (2013.01)

(58) Field of Classification Search
CPC combination set(s) only.
See application file for complete search history.

(56) References Cited

U.S. PATENT DOCUMENTS 4,629,569 A * 12/1986 Gimbel .................. B01D 29/01
                                                         210/488
5,256,294 A * 10/1993 van Reis .............. B01D 61/142
                                                         210/137
(Continued)

OTHER PUBLICATIONS

International Search Report and Written Opinion for PCT/US13/65800, Dated: Jan. 16, 2014 (10 pages).
(Continued)

*Primary Examiner* — Ryan B Huang
(74) *Attorney, Agent, or Firm* — Moazzam & Associates, LLC

(57) ABSTRACT

The present disclosure provides for devices, systems and methods for fractionation and concentration of particles from a fluid sample. This includes a cartridge containing staged filters having porous surface in series of decreasing pore size for capture of particles from a fluid sample; and a permeate pressure source in fluid communication with the cartridge; wherein the particles are eluted from the porous surfaces and dispensed in a reduced fluid volume.

9 Claims, 19 Drawing Sheets

(51) Int. Cl.
*B01D 61/22* (2006.01)
*B01D 63/08* (2006.01)

(56) References Cited

U.S. PATENT DOCUMENTS

| | | | |
|---|---|---|---|
| 6,544,423 B1* | 4/2003 | Baurmeister | B01D 53/22 |
| | | | 210/321.84 |
| 2003/0052050 A1* | 3/2003 | Vigna | B01D 3/20 |
| | | | 210/321.84 |
| 2003/0185974 A1* | 10/2003 | Serafin | B01D 61/142 |
| | | | 427/180 |
| 2004/0053422 A1* | 3/2004 | Chan et al. | 436/180 |
| 2007/0151925 A1 | 7/2007 | De Los Reyes et al. | |
| 2008/0017578 A1* | 1/2008 | Childs | B01D 63/06 |
| | | | 210/650 |
| 2009/0101575 A1* | 4/2009 | Alburty | G01N 1/4077 |
| | | | 210/636 |
| 2010/0059443 A1* | 3/2010 | Brellisford | B01D 63/082 |
| | | | 210/656 |
| 2011/0061474 A1* | 3/2011 | Page | G01N 1/4077 |
| | | | 73/863.23 |
| 2011/0220502 A1* | 9/2011 | Selden et al. | 204/457 |

OTHER PUBLICATIONS

International Preliminary Report and Written Opinion; International Application No. PCT/US2013/065800; dated Apr. 21, 2015.
SIPO Office Action dated Oct. 8, 2016 for application 201380066574.2.

* cited by examiner

Step 1
- The user is prompted to: *"Place a waste container under the retentate ports"* and press *"Ok"*
- The rotary valve rotates CW to position 6 (NaOH reservoir)

Step 2 • The syringe draws 3mL of NaOH

Step 3
- The Rotary valve rotates CCW to position 2 (NaOH inlet)
- The Humic Stage Iso. valves open
- The syringe slowly pushes all 3mL of NaOH through the cell (~6mL/min)

Step 4
- The syringe completes its stroke
- The following valves change state simultaneously:
  - Bypass Valves 1-5 open
  - The isolation valves open
  - The Humic Stage Iso. valves close Step 5 — The Gas Valve pulses to force the NaOH out the retentate ports Step 6 — The foam valve pulses several times to rinse the cell Step 7 • The Gas Valve pulses to push out the rest of the foam Step 8
• The user is prompted to: "*Place a sample container under the retentate ports*" and press "*Ok*"
• The following valves change position simultaneously:
  - The Isolation Valves close
  - The Feed/Perm Iso. Valves open
  - The Humic Stage Iso. Valves open
• The syringe draws its full volume Step 9
- Diagnostic: The cell should now be at a full vacuum, from now until Step 12, the pressure should not increase by a significant amount. The user should be prompted if it is beyond the pre-set limit.
- The following valves change position simultaneously:
  - Filter Bypasses 1-5 close
  - Humic Stage Iso. Valves close
  - Rotary valve rotates CCW to position 1 (waste)
- The syringe expels its full volume

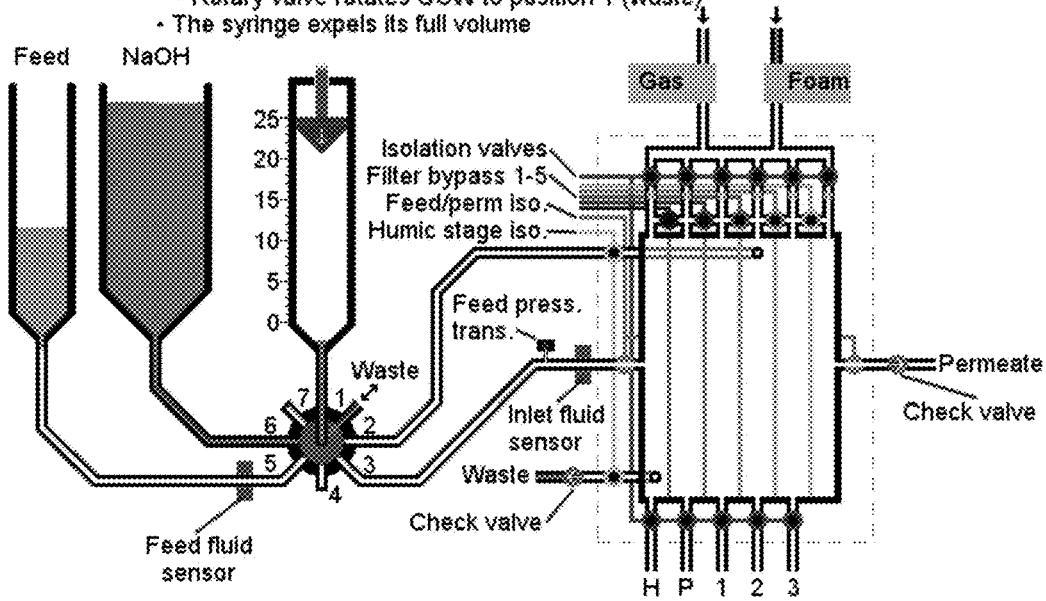

FIG. 8I

Step 10
- Rotary valve rotates CW to position 5 (Feed Reservoir)
- The syringe draws in the feed sample

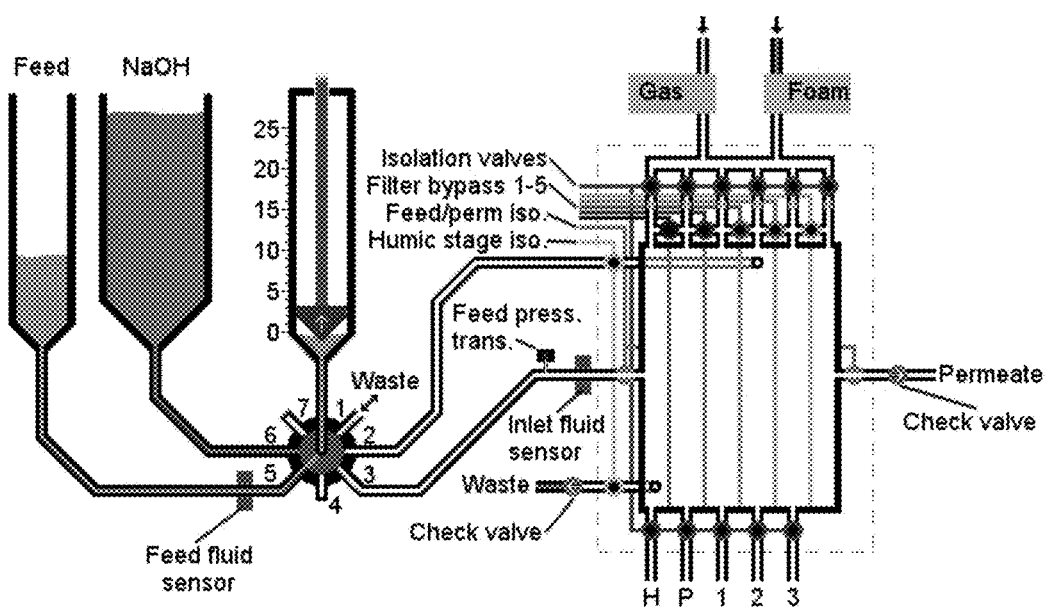

FIG. 8J

Step 11
- The Feed Fluid Sensor sees no fluid
- The syringe draws and additional 10mL of air Step 12
- The rotary valve rotates CCW to position 4 (blocked)
- The syringe draws full volume Step 13
- The rotary valve rotates CCW to position 3 (Cell inlet)
- The syringe starts driving the feed sample at the pressure setpoint Step 14
- The Inlet Fluid Sensor sees no fluid
- The first stage locks up and the syringe must stop to prevent exceeding the pressure setpoint Step 15 • As each stage locks up, the Bypass Valve for that stage is opened allowing air to pass around the filter Step 16 • After the final Filter Bypass valve has been opened, the pressure will drop rapidly to ambient
• The syringe continues its stroke to expel its full volume Step 17
- The syringe completes its stroke
- All of the Bypass Valves close
- The Feed/Perm Iso. Valves close
- The Isolation Valves open Step 18   • The Foam Valve pulses to elute the cell Step 19
- The Gas Valve pulses to push out the remaining foam
- The user is prompted: "Elute again" or "Complete run"
  - If "Elute again"; repeat steps 18 and 19
  - If "Complete run"; continue to step 20

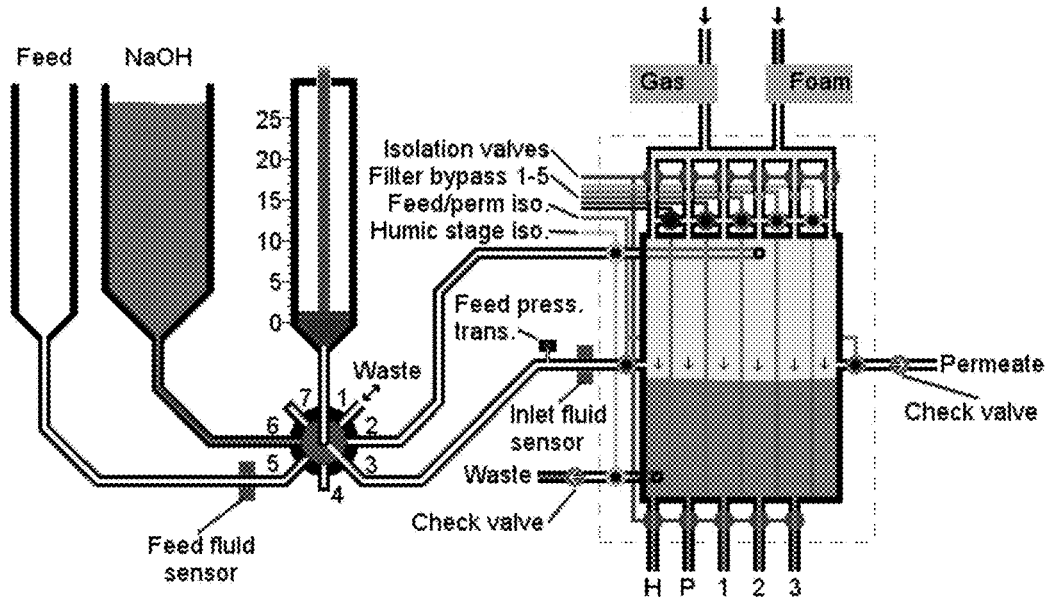

FIG. 8S

Step 20
- The following valves change position simultaneously:
  - The Isolation Valves close
  - The Filter Bypass Valves 1-5 open
  - The Feed/Perm Iso. Valves open
  - The Humic Stage Iso. Valves open
- After a short pause, the syringe draws its full volume

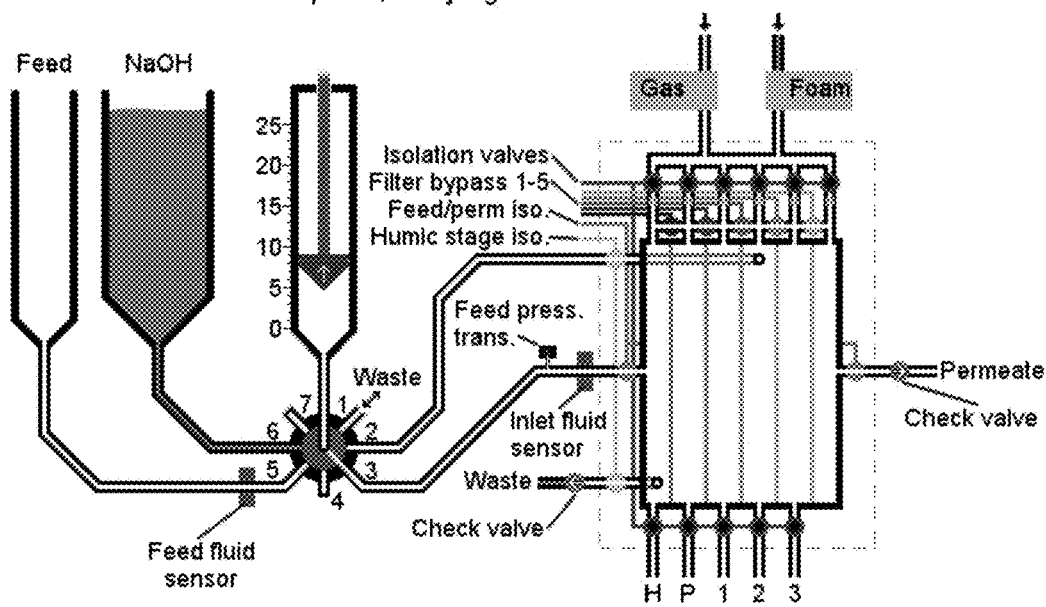

FIG. 8T

Step 21
- The rotary valve rotates CCW to position 1 (waste)
- The Feed/Perm Iso. Valves close
- The Filter Bypass Valves 1-5 close
- The syringe expels it's full volume Step 22
- The rotary valve rotates CW to position 6 (NaOH reservoir)
- The syringe draws 4mL Step 23
- The rotary valve rotates CCW to position 2 (NaOH inlet)
- The syringe slowly pushes the NaOH into the cell (~6mL/min)
- 3mL of the fluid fills the inside of the cell, while the additional 1mL back flushes the humic stage and goes to waste Step 24
- The Humic Stage Iso. Valves close
- The rotary valve rotates CCW to position 1 (waste)
- The system resets ns per minute (RPM) or g-forces. The particle settling velocity in centrifugation is a function of the particle's size and shape, centrifugal acceleration, the volume fraction of solids present, the density difference between the particle and the liquid, and viscosity of the liquid.

LIQUID TO LIQUID BIOLOGICAL PARTICLE FRACTIONATION AND CONCENTRATION

This U.S. patent application claims priority to U.S. Provisional Patent Application Ser. No. 61/715,451, filed Oct. 18, 2012, the content of which is hereby incorporated by reference herein in its entirety into this disclosure.

GOVERNMENT INTERESTS

This subject disclosure was made with U.S. Government support under Department of Homeland Security (DHS) Grant No. D12PC00287. The government has certain rights in this subject disclosure.

BACKGROUND OF THE SUBJECT DISCLOSURE

1. Field of the Subject Disclosure

The subject disclosure relates generally to the field of sample preparation. More particularly, the subject disclosure relates to devices, systems and methods for fractionating and concentrating substances within a fluid sample.

2. Background of the Subject Disclosure

The difficulties of detecting and quantifying particles in air and liquids are well known. Existing systems all begin to fail as concentration falls away until eventually, with diminished concentrations of analyte, there is an inability to detect at all. This poses a significant problem for national security where, for example, the postal anthrax attacks of 2001 and the subsequent war on terrorism have revealed shortcomings in the sampling and detection of biothreats. The medical arts are similarly affected by the existing limits on detection, as are the environmental sciences.

In the fields of biodefense and aerosol research it is common to collect aerosols into a liquid sample using a wet cyclone or similar device. The aerosol is collected into an aqueous sample so that subsequent analysis of biological particles can be performed using standard techniques that primarily require that the sample be contained in liquid. These "wet" collectors have many failings, including: difficulty in maintaining a set fluid volume, difficulties with buildup of particle matter in the device, and requirements for storage of the fluid in varying environmental conditions.

Dry filters have long been used for collection of aerosols, as well as for collection of particles from liquids. However, dry filters fail primarily for the use of identifying biological particles because detectors generally require a liquid sample and it is extremely difficult to remove the particles into a liquid. Methods for removing particles from flat filters are common but are tedious, inefficient, and require large liquid volumes.

Concentration of particles from a liquid is traditionally performed using centrifugation. Centrifugal force is used for the separation of mixtures according to differences in the density of the individual components present in the mixture. This force separates a mixture forming a pellet of relatively dense material at the bottom of the tube. The remaining solution, referred to as the supernate or supernatant liquid, may then be carefully decanted from the tube without disturbing the pellet, or withdrawn using a Pasteur pipette. The rate of centrifugation is specified by the acceleration applied to the sample, and is typically measured in revolutions per minute (RPM) or g-forces. The particle settling velocity in centrifugation is a function of the particle's size and shape, centrifugal acceleration, the volume fraction of solids present, the density difference between the particle and the liquid, and viscosity of the liquid.

Problems with the centrifugation technique limit its applicability. The settling velocity of particles in the micron size range is quite low. Consequently, centrifugal concentration of these particles takes several minutes to several hours. The actual time varies depending on the volume of the sample, the equipment used, and the skill of the operator.

Centrifugation techniques are tedious in that they are normally made up of multiple steps each requiring a high level of concentration from the operator. Most microbiology laboratories process large numbers of samples by centrifugation on a daily basis. The potential for human error is high due to the tedious nature and automation of these techniques is difficult and costly. Centrifugation also generally requires powered equipment. Thus, many situations, such as emergency response, prevent their use.

Other concentration techniques have been explored and primarily fall into three technology groups—microfluidic/electrophoretic based, filtration based, and capture based. However, each of these techniques has disadvantages that prevent their use in certain situations.

SUMMARY OF THE SUBJECT DISCLOSURE

In light of the limitations of conventional techniques, what is needed is a single device for fractionating and concentrating a fluid sample into several component concentrations.

In so doing, the present subject disclosure presents novel, rapid, efficient one-pass membrane filter based fractionation and concentration devices, systems and methods that fractionate and concentrate particles, and especially biological particles suspended in liquid from a dilute feed suspension ("feed") into size fractioned and concentrated sample suspensions (retentate), eliminating the separated fluid (permeate) in a separate stream. The subject disclosure is particularly useful for the fractionation and concentration of suspended biological particles, such as proteins/toxins, viruses, DNA, and bacteria in the size range of approximately 0.001 micron to 20 microns diameter. Concentration of these particles is advantageous for detection of target particles in a dilute suspension, because concentrating them into a small volume makes them easier to detect. Fractionation is performed in "cascade" fashion, in order to concentrate particles below the size cut of each preceding stage remaining in the separated fluid in a concentrated sample suspension. This process can also be used to create a "band-pass" concentration for concentration of a particular target size particle within a narrow range. The device uses pressure on the feed side, vacuum on the permeate side, and/or mechanical shear to accelerate the separation process, and may include an added surfactant to increase efficiency. Integrated pneumatic, hydraulic, or mechanical valving and a novel vacuum startup procedure allow for startup of wet membranes while reducing liquid hold-up volume in the device. The cascade filter stack is unique in that the sample flow is perpendicular to the surface of a stack of filters, in series, enclosed in a housing with only a small open interstitial space between each filter with elution of the filters performed by a simultaneous wet foam elution performed parallel, or tangential, to the retentate filter surface through the small interstitial space. Foam elution is performed simultaneously one each of the filter stages, so that transmembrane pressure across each membrane during elution remains essentially zero or near to it. In this way, flow of elution fluid through the membranes is eliminated or significantly reduced, so that the tangential flow velocity and elution efficiency are maximized. The extraction foam can be prepared from pressurized gas and a surfactant dissolved in the collection fluid.

In one exemplary embodiment, the present subject disclosure is a device for fractionation and concentration of particles from a fluid sample. The device includes a cartridge containing staged filters having porous surface in series of decreasing pore size for capture of particles from a fluid sample; and a permeate pressure source in fluid communication with the cartridge; wherein the particles are eluted from the porous surfaces and dispensed in a reduced fluid volume.

In another exemplary embodiment, the present subject disclosure is a system for fractionation and concentration of particles from a fluid sample. The method includes a reservoir holding a fluid sample; a fractionation and concentration cartridge including two or more staged filters; a permeate pressure device in fluid communication with the cartridge; a concentrating unit including an actuating integral valving to move sample through the cartridge; and a fluid dispenser source for collecting concentrated samples from the cartridge staged filters; wherein the fluid sample is moved through the concentrating unit, then the concentrated samples are eluted from the filters and dispensed.

In yet another exemplary embodiment, the present subject disclosure is a system for rapid fractionation and concentration of particles from a fluid sample. The system includes introducing a sample into the sample reservoir; initiating a fractionation and concentration cycle; passing the fluid sample through a series of filters; eluting a plurality of particles of decreasing particle size from each filter stage; and extracting a concentrated sample from each filter stage.

DETAILED DESCRIPTION OF THE SUBJECT DISCLOSURE

Figure 1A:
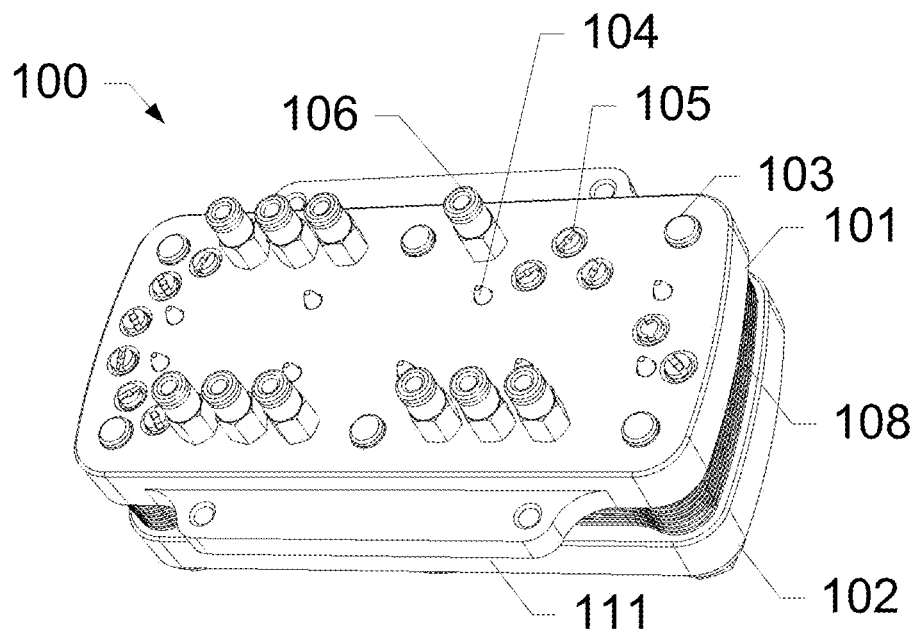
FIG. 1A shows a manifold portion of a five stage fluidics device, according to an exemplary embodiment of the present subject disclosure.

The present subject disclosure relates generally to the fields of bioterrorism security, medicine, and environmental science. Rapid, reliable detection of airborne biothreats is a significant need for the protection of civilians and military personal from pandemic outbreaks and bioterrorist events. Best in class biothreat detection systems use aerosol collectors to capture particles into a liquid volume in the range of 2 to 12 mL. Samples are then processed using a number of sample preparation techniques and analyzed by rapid microbiological methods, including real-time quantitative polymerase chain reaction (qPCR) and ultra-high throughput sequencing (UHTS) and/or gold-standard culture based methods. While the state of the art for rapid detectors, collectors, and identifiers has advanced dramatically in recent years, advancement of sample preparation techniques has lagged significantly and considerable improvements are needed in these techniques.

Detect/collect/identify systems for airborne biothreats must operate correctly in all types of indoor and outdoor environments. Urban, industrial, and rural outdoor environments as well indoor environments range from very low to very high particle concentrations. Detection of threats in these varied environments often hinges on the ability of the system to capture and identify rare threat particles in what can be a highly varied, complex mixture of organic and inorganic debris particles, innocuous microbes, pollen, fungal spores, and mammalian cells.

Better automated sample preparation techniques are needed so problems currently associated with detection of rare particles in complex environmental samples can be overcome. Inhibition of identification techniques due to environmental debris is a common problem with these systems due to the varied, high-level complex mixtures of particle and chemical inhibitors. UHTS, qPCR, and other rapid detection techniques can also fail due to high levels of background clutter. Breakdown of bioinformatic systems used for UHTS data analysis due to high background clutter levels is one of the biggest hurdles that must be overcome before cutting-edge sequencing can be adapted to autonomous biothreat detection applications. There is also a significant requirement to be able to differentiate between target agents coming from whole, viable cells and those present as free DNA or free proteins. The inability to rapidly determine if the target particle is a whole viable cell or is only present as free DNA or protein signature, as is the norm in today's biothreat detection systems, does not allow organizations to differentiate between what may be an actual terrorist event from potentially catastrophic false alarms associated with hoaxes or natural events.

Aerosol samples and other samples of importance (e.g., surface, liquid, clinical, food, etc.), often contain a significant amount and wide range of non-target debris including organic and inorganic matter and biological materials. As described above, these non-target materials can significantly affect the performance of sample preparation and agent identification techniques with a common side effect of inhibition. Conventional sample preparation techniques exist for removing these inhibitors, but they are slow and perform best when volumes of only a few hundred microliters are processed—demonstrating the mismatch between collected sample size and the volume that can be processed and analyzed by available technologies. This mismatch raises the true system detection limit to levels significantly higher than the desired detection limit and creates a significant likelihood of false negative results when, as would typically be the case, only trace levels of signature are present.

A wide range of existing, and developing, rapid analysis platforms are potentially useful technologies for detection and identification needs. Detection and identification may key on whole organisms, nucleic acids, or proteins. Culture based analysis, antibiotic susceptibility testing, and functional assays all require live organism samples. Common nucleic acid techniques include qPCR, UHTS, and hybridization arrays. ELISA and other immunoassay techniques, mass spectrometry, chromatography techniques, and other techniques may be used for protein analysis. There are significant reasons in some cases to choose one of these techniques over the other or in some cases to analyze with more than one technique. Additionally some techniques lend themselves to use in autonomous detection platforms and some are used only in laboratory settings. Further, it is difficult to determine what techniques may receive precedence in the near future as costs fall or new improved methods are developed. This difficulty in determining what detection and identification system may be used warrants the need for a plug-and-play type of sample preparation system that is capable of delivering the needed sample fractions in a concentrated form for each potential type of analysis.

Robust, fast, and sensitive detection systems are needed, but currently most systems fail to meet these needs due to deficiencies in sample preparation. The sample preparation system must be capable of autonomous operation for a month or more without maintenance. The same environmental particles and inhibitors that commonly cause issues with the identifier can also lead to failure of the sample preparation system, especially after repeated use over extended periods of time. The time required for the sample preparation methods used for these complex samples is a large portion of the total time needed for identification and, even so, the methods are only capable of processing a very small portion of the available sample.

The present subject disclosure presents a novel technique of fractionating multiple components simultaneously. It may be used in numerous fields, including, but not limited to, bioterrorism detection. For example, exemplary and specific fields of use include, but are not limited to:

1. Aerosol sampling for bioterrorism threat agents
   a. Where the sample results in a liquid sample for analysis
   b. Where the sample can contain target agent(s) that are thought to be a substantial threat to the health of humans
      i. Where a list of the potential threat (target) agent(s) can be taken from the U.S. Food and Drug Administration's Centers for Disease Control and Prevention (CDC) Select Agents A, B, or C list (See List 1, below)
   c. Where the sample can contain target agent(s) that are thought to be a threat to the health of humans, animals or plants, causing societal disruption and economic harm
      i. Where a list of the potential threat (target) agents can be taken from the CDC agent list (http://www.bt.cdc.gov/agent/agentlist.asp), or List 2, below
   d. Where the resulting sample can contain test particles, target agent(s) or surrogate(s) in a concentration too small for detection by the chosen method
      i. Where concentration of the sample into a smaller volume can result in detection of the threat agent(s) of interest by one or a combination of the following methods:
         1. Where detection of the threat agent(s) is performed by polymerase chain reaction (PCR) or PCR-like methods
         2. Where detection of the threat agent(s) of interest is performed by immunoassay methods
         3. Where detection of the threat agent(s) of interest is performed by ultraviolet light fluorescence methods
      ii. Or where concentration and analysis resulting in a non-detect result can provide assurance that if the target agent is present, it is present in such a low quantity that the resulting risk to the affected population is minimal
      iii. Where separation of the sample into desirable size fractions can concentrate the target particles into separate but equally concentrated size fractions for analysis by different detection methods listed in 1.c.i. above, such as:
         1. Separating and concentrating particles larger than 0.2 microns to separate and concentrate bacteria
      iv. Where a small size range or "band-pass" can be separated out and concentrated for interrogation for a particular threat agent or surrogate, such as:
         1. separating and concentrating particles from 0.2 microns diameter to 2 microns diameter to separate bacterial spores and concentrate them separately from smaller and larger particles present in the initial sample
         2. separating and concentrating particles from 0.005 microns to 0.2 microns diameter to separate most viruses and concentrate them separately from smaller and larger particles present in the initial sample (examples include viral equine encephalitis, or VEE; 0.06 microns diameter).
         3. separating and concentrating particles from 0.001 microns (approximately 5 kiloDaltons) to 0.01 microns (approximately 100 kiloDaltons) to separate toxins and proteins and concentrate them separately from smaller and larger particles present in the initial sample
2. The above types of sampling and analysis are performed for the fields of homeland security, corporate security, and military force protection:
   a. Automated sampling and analysis systems such as those developed for government programs Portal Shield, Joint Programs Biological Detection System (JPBDS), US Postal Service Biological Detection System (BDS), and systems under development, such as the Biological Aerosol Networked Detection (BAND) system and Rapid Aerosol Biological Identification System (RABIS)
   b. Manual systems such as bioaerosol collection using air/liquid impingers, including the All Glass Impinger (AGI-30, Ace Glass, Inc., Vineland, N.J.), Greenburg-Smith impingers, and SKC Biosamplers provide samples that are in the 20-100 mL size range, and can be concentrated down to the 4-400 uL volume range using the InnovaPrep device and process described here
  c. Samples resulting from manual swabbing of surfaces onto wetted swabs, pads, or pieces of filter material are often taken for bioterrorism security monitoring and are typically extracted into a volume of liquid resulting in a 2 to 20 mL volume initial sample. Samples like these can be quickly concentrated to much smaller volumes in the range of 4-400 uL using the InnovaPrep
3. Water sampling for bioterrorism threat agents
  a. Where the sample can contain target agent(s) that are thought to be a substantial threat to the health of humans by ingestion or contact
    i. Where a list of the potential threat (target) agent(s) can be taken from the U.S. Food and Drug Administration's Centers for Disease Control and Prevention (CDC) Select Agents A, B, or C list (See List 1, below)
  b. Where the sample can contain target agent(s) that are thought to be a threat to the health of humans, animals or plants, causing societal disruption and economic harm
    i. Where a list of the potential threat (target) agents can be taken from the CDC agent list (http://www.bt.cdc.gov/agent/agentlist.asp), or List 2, below
  c. Where the resulting sample can contain test particles, target agent(s) or surrogate(s) in a concentration too small for detection by the chosen method
    i. Where concentration of the sample into a smaller volume can result in detection of the threat agent(s) of interest by one or a combination of the following methods:
      1. Where detection of the threat agent(s) is performed by polymerase chain reaction (PCR) or PCR-like methods
      2. Where detection of the threat agent(s) of interest is performed by immunoassay methods
      3. Where detection of the threat agent(s) of interest is performed by ultraviolet light fluorescence methods
    ii. Or where concentration and analysis resulting in a non-detect result can provide assurance that if the target agent is present, it is present in such a low quantity that the resulting risk to the affected population is minimal
    iii. Where separation of the sample into desirable size fractions can concentrate the target particles into separate but equally concentrated size fractions for analysis by different detection methods listed in 1.c.i. above, such as:
      1. Separating and concentrating particles larger than 0.2 microns to separate and concentrate bacteria
    iv. Where a small size range or "band-pass" can be separated out and concentrated for interrogation for a particular threat agent or surrogate, such as:
      1. separating and concentrating particles from 0.2 microns diameter to 2 microns diameter to separate bacterial spores and concentrate them separately from smaller and larger particles present in the initial sample
      2. separating and concentrating particles from 0.005 microns to 0.2 microns diameter to separate most viruses and concentrate them separately from smaller and larger particles present in the initial sample (examples include viral equine encephalitis, or VEE; 0.06 microns diameter).
      3. separating and concentrating particles from 0.001 microns (approximately 5 kiloDaltons) to 0.01 microns (approximately 100 kiloDaltons) to separate toxins and proteins and concentrate them separately from smaller and larger particles present in the initial sample
4. The above types of sampling and analysis are performed for the fields of homeland security, corporate security, and military force protection:
  a. Water samples taken from water sources used to produce potable water for consumption by the public or government use
  b. Water samples taken to determine a source of production of bioterrorism agents
  c. Water samples taken to determine whether biological decontamination has been effective
5. Agricultural samples for bioterrorism threat agents
  a. Where the sample can contain target agent(s) that are thought to be a substantial threat to the health of plants or animals, or indirectly to humans after ingestion of contaminated agricultural products
  b. Where the sample is liquid or can be extracted into a liquid for analysis
    i. Where a list of the potential threat (target) agent(s) can be taken from the U.S. Food and Drug Administration's Centers for Disease Control and Prevention (CDC) Select Agents A, B, or C list (See List 1, below)
  c. Where the sample can contain target agent(s) that are thought to be a threat to the health of humans, animals or plants, causing societal disruption and economic harm
    i. Where a list of the potential threat (target) agents can be taken from the CDC agent list (http://www.bt.cdc.gov/agent/agentlist.asp), or List 2, below
  d. Where the resulting sample can contain test particles, target agent(s) or surrogate(s) in a concentration too small for detection by the chosen method
    i. Where concentration of the sample into a smaller volume can result in detection of the threat agent(s) of interest by one or a combination of the following methods:
      1. Where detection of the threat agent(s) is performed by polymerase chain reaction (PCR) or PCR-like methods
      2. Where detection of the threat agent(s) of interest is performed by immunoassay methods
      3. Where detection of the threat agent(s) of interest is performed by ultraviolet light fluorescence methods
    ii. Or where concentration and analysis resulting in a non-detect result can provide assurance that if the target agent is present, it is present in such a low quantity that the resulting risk to the affected population is minimal
    iii. Where separation of the sample into desirable size fractions can concentrate the target particles into separate but equally concentrated size fractions for analysis by different detection methods listed in 1.c.i. above, such as:
1. Separating and concentrating particles larger than 0.2 microns to separate and concentrate bacteria iv. Where a small size range or "band-pass" can be separated out and concentrated for interrogation for a particular threat agent or surrogate, such as:
1. separating and concentrating particles from 0.2 microns diameter to 2 microns diameter to separate bacterial spores and concentrate them separately from smaller and larger particles present in the initial sample
2. separating and concentrating particles from 0.005 microns to 0.2 microns diameter to separate most viruses and concentrate them separately from smaller and larger particles present in the initial sample (examples include viral equine encephalitis, or VEE; 0.06 microns diameter).
3. separating and concentrating particles from 0.001 microns (approximately 5 kiloDaltons) to 0.01 microns (approximately 100 kiloDaltons) to separate toxins and proteins and concentrate them separately from smaller and larger particles present in the initial sample v. Where exclusion of interferent particles such as diesel soot is desirable to improve the performance of the analysis method [minimization of interference or improvement of "contrast" may be desirable for all fields]

6. The above types of sampling and analysis are performed for the fields of homeland security, corporate security, and military force protection:
   a. Where foodstuffs such as milk is monitored for toxin contamination such as by ricin
   b. Where meatpacking plants are monitored for biological contamination by *E. coli, Listeria* spp. Such monitoring is also conducted for quality assurance, such as hazard assessment and critical control point (HACCP) programs
   c. For bottled water production The present subject disclosure may be used to assist in identifying agents from the following lists:

List 1: CDC Category A and B Bioterrorism Agents List
Category A (Definition Below)
Anthrax (*Bacillus anthracis*)
Botulism (*Clostridium botulinum* toxin)
Plague (*Yersinia pestis*)
Smallpox (variola major)
Tularemia (*Francisella tularensis*)
Viral hemorrhagic fevers (filoviruses [e.g., Ebola, Marburg] and arenaviruses [e.g., Lassa, Machupo])
Category B (Definition Below)
Brucellosis (*Brucella* species)
Epsilon toxin of *Clostridium perfringens*
Food safety threats (e.g., *Salmonella* species, *Escherichia coli* O157:H7, *Shigella*)
Glanders (*Burkholderia mallei*)
Melioidosis (*Burkholderia pseudomallei*)
Psittacosis (*Chlamydia psittaci*)
Q fever (*Coxiella burnetii*)
Ricin toxin from *Ricinus communis* (castor beans)
Staphylococcal enterotoxin B
Typhus fever (*Rickettsia prowazekii*)
Viral encephalitis (alphaviruses [e.g., Venezuelan equine encephalitis, eastern equine encephalitis, western equine encephalitis])
Water safety threats (e.g., *Vibrio cholerae, Cryptosporidium parvum*)

List 2: Secondary Potential Biological Threat Agents
Viri/Prions
Flaviviruses (Yellow fever virus, West Nile virus, Dengue, Japanese Encephalitis, TBE, etc.)
Hep A, B, C
Prions (CJD, BSE, CWD)
Alphaviruses (VEE, EEE, WEE)
Nipah virus
Rabies virus
Rhinovirus (could be modified?)
Polioviruses
Hantaviruses
Filoviruses (Ebola, Marburg, Lassa)
Bacilli
*Mycobacterium tuberculosis*, drug resistant
*Mycobacteria* other than TB, like *C. leprae*
*Streptococcus pneumoniae*
*S. pyogenes*
*S. aureus*
*Clostridium tetani*
*C. difficile*
*Bacillus cereus*
*Coxiella brunette* (Q fever)
*Francisella tularensis*
*Borrelia recurrentis*
*Rickettsia rickettsii*
*R. prowazekii*
*Shigella sonnei*
*Bartonella henselae*
*Yersinia enterolitica*
*Y. pseudotuberculosis*
*Neisseria meningitidis*
*Legionella pneumophila*
*Burkholderia pseudomallei*
*Pasturella multocida*
Other Pathogenic Microorganisms
*Cryptosporidium parvum*
*Histoplasma capsulatum*
*Cryptococcus neoformans*
*Aspergillus niger*
Pathogenic Fungi
*Acremomium* spp.
*Alternaria alternate*
*Apophysomyces elegans*
*Aspergillus terreus*
*Bipolaris* spp.
*Bipolaris spicifera*
*Blastoschizomyces capitatus*
*Candida krusei*
*Candida lusitaniae*
*Cladophialophora bantiana*
*Cunnihamella berholletiae*
*Curvularia lunata*
*Exserohilum rostratum*
*Fusarium moniliforme*
*Fusarium solani*
*Hansenula anomala*
*Lasiodilodia theobromae*
*Malassezia furfur*
*Paecilomyces lilacinus*
*Paecilomyces bariotii*
*Penicillium marneffei*

*Phialemonium curvatum*
*Philophora parasitica*
*P. richardsiae*
*Ramichloridium* spp.
*Rhizomucor pusillus*
*Rhizopus rhizopodiformus*
*Rhodotorula rubra*
*Sacchromyces cerevisiae*
*Scedosporium prolificans*
*Trichosporon beigelii* (*T. asahii*)
*Wangiella dermatitidis*

The present subject disclosure may be used to assist in identifying various agents of varying sizes:

Definition of Category A Diseases/Agents

The U.S. public health system and primary healthcare providers must be prepared to address various biological agents, including pathogens that are rarely seen in the United States. High-priority agents include organisms that pose a risk to national security because they
- can be easily disseminated or transmitted from person to person;
- result in high mortality rates and have the potential for major public health impact;
- might cause public panic and social disruption; and
- require special action for public health preparedness.

Definition of Category B Diseases/Agents

Second highest priority agents include those that
- are moderately easy to disseminate;
- result in moderate morbidity rates and low mortality rates; and
- require specific enhancements of CDC's diagnostic capacity and enhanced disease surveillance.

Definition of Category C Diseases/Agents

Third highest priority agents include emerging pathogens that could be engineered for mass dissemination in the future because of
- availability;
- ease of production and dissemination; and
- potential for high morbidity and mortality rates and major health impact Physical Sizes of Some Agents and Surrogates:

Target:
- *Bacillus thuringiensis* endospore—approximately 1 μm
- *Bacillus anthracis* endospore—approximately 1 μm
- *Yersinia pestis*—Gram negative rod-ovoid 0.5-0.8 μm in width and 1-3 μm in length
- *Yersinia rohdei*—approximately 1 μm
- Venezuelan Equine Encephalitis—70 nm (0.07 μm)
- Gamma-killed MS2—2 mD or about 25 nm (0.025 μm) (but will pass through a 300 kD pore size but is retained by a 100 kD pore size Wick and McCubbin—ECBC)
- Ovalbumin—45 kD or 6 nm (0.006 μm)
- Botulinum Toxoid A—150 to 900 kD or 10 nm to 70 nm (0.01 μm to 0.07 μm) (Normally published as 150 kD however some publications state that toxoid A can be released as complexes comprised of the 150 kD toxin protein along with associated non-toxin proteins and can therefore be released in 900 kD, 500 kD, and 300 kD forms.
- DNA—1000 Bp or 600 kD up to 15,000 Bp or 9 mD Specific fields of use in the medical field include, but are not limited to:

1. The above types of sampling and analysis are performed for the fields of medical research and diagnostics:
   a. In cancer research where very low concentrations of experimental drugs in body fluids or urine are the targets of analysis
   b. In allergy diagnosis where low quantities of specific antigens are the targets of analysis in body fluids
   c. In health effects research regarding the determination of health effects known to be caused by various materials in inhaled particulate matter with aerodynamic diameter below 2.5 microns (PM 2.5). this area overlaps with environmental studies (see below).
   d. In forensic medicine where low concentrations of toxins or venoms are the targets of analysis in body fluids
   e. In operating rooms [surface extraction and air monitoring, add]
   f. In pharmaceutical manufacturing where the biological aerosol particulate matter concentration is regulated by the US Food and Drug Administration Specific fields of use in the environmental studies field include, but are not limited to:
[similar to outline above, modified to fit the environmental applications]

2. The above types of sampling and analysis are performed for the field of environmental study:
   a. In health effects research regarding the determination of health effects known to be caused by various materials in inhaled particulate matter with aerodynamic diameter below 2.5 microns (PM 2.5)
   b. High altitude aerosol research where low quantities of particulate are collected and must be concentrated for study
   c. In cleanrooms where very low aerosol concentrations of aerosol particles are collected for monitoring aimed at source control
   d. For separation of populations of particles collected at different heights above the ground (profiling studies)

The present subject disclosure has been developed as a unique membrane filter based fractionation and concentration system that is capable of separating particles by size and concentrating those particles into small (<100 μL) sample volumes. A novel approach was developed in which the membrane filters are stacked, in order of decreasing pore size, inside a single cartridge with a small interstitial space, or in some cases a solid filter support and further reduced interstitial space, between each membrane filter. Sample flow is introduced perpendicular to the first filter surface and is pushed or pulled, in series, directly through each of the membrane in the cartridge. Because the cartridge can be designed for reuse, and because wet hydrophilic membrane filters will not allow air to flow through at pressures below the bubble point, a novel vacuum startup method is used to allow air to be removed from the interstitial space and other internal volume, so that the sample process can be initiated. A series of channels and associated valves, integral to the cartridge, are used to link each stage back to a pump to allow for negative pressure to be pulled on the system.

After negative pressure has been pulled on the system, the sample flow is introduced as described above. The entire sample is flowed through the cartridge, until air reaches the first membrane filter and the system locks up. The vacuum startup valves are then actuated one by one to allow the remaining fluid to be pushed through the remaining membrane filters. When then entire sample volume has been processed then the cartridge inlet and outlet valves are closed and a retentate valve is opened on each stage. A wet carbonated foam is then introduced into one end of the cartridge, which subsequently travels the length of the cartridge, tangential to the retentate surface of each membrane. Finally the foam is dispensed out of the retentate port into a separate sample container for each membrane filter. The foam then breaks down into a liquid leaving a small concentrate fraction associated with each membrane filter stage.

Figure 7A:
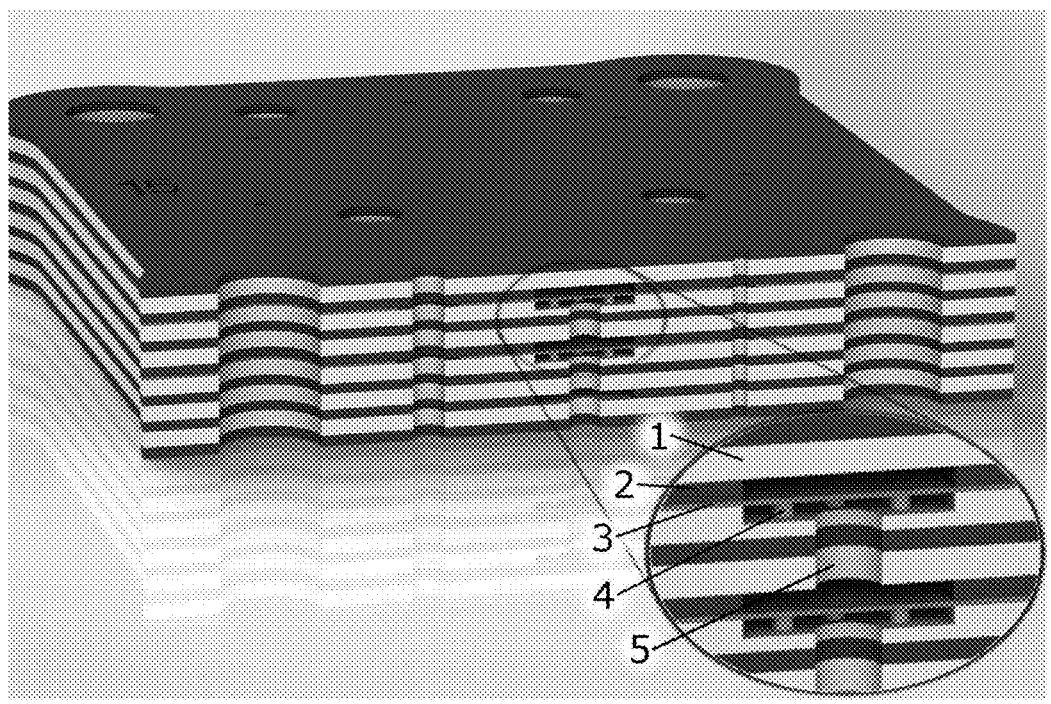
FIG. 7A shows a cross sectional view of a two stage filter stack with integral filter supports, according to an exemplary embodiment of the present subject disclosure.
Figure 7B:
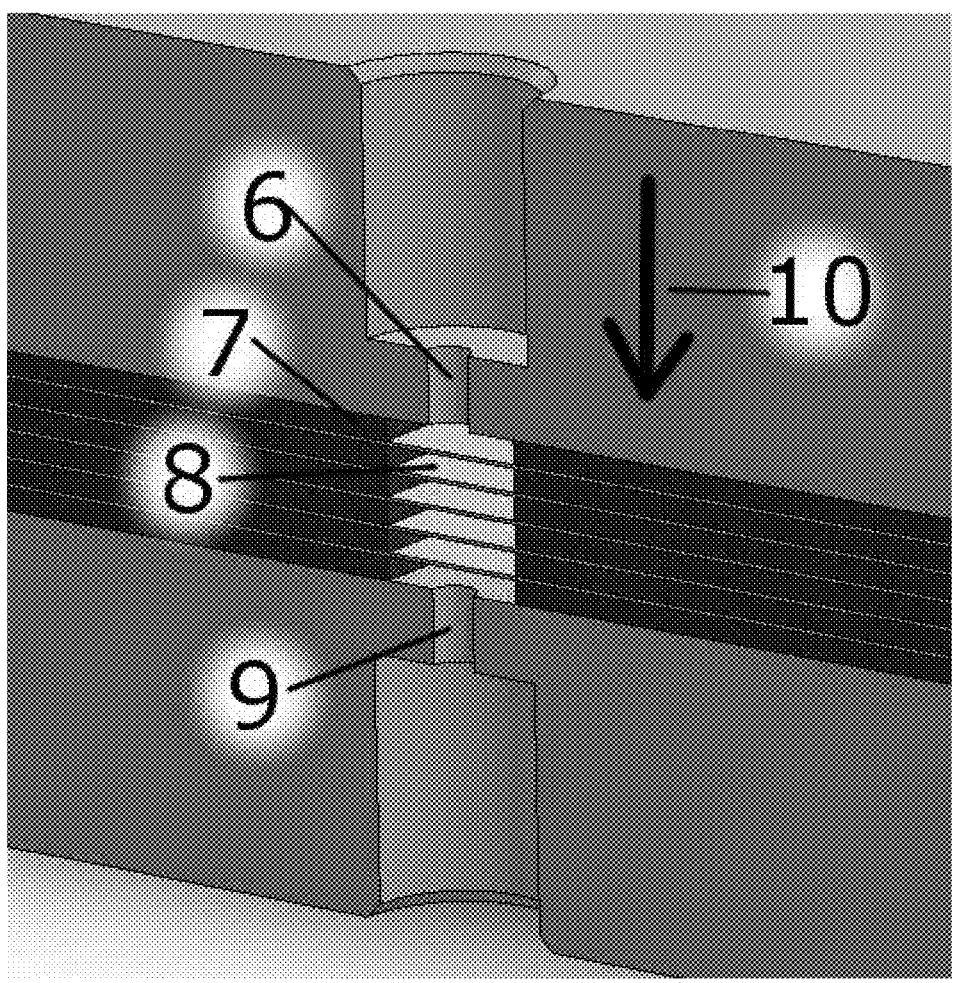
FIG. 7B shows a cross sectional view of a two stage filter stack with no filter support, according to an exemplary embodiment of the present subject disclosure.

The subject disclosure of the present application, which describes liquid-to-liquid fractionation and concentration devices, systems and methods, provides a novel means of rapidly and efficiently separating and then concentrating biological samples. Significant advantages are offered over current methods including, but not limited to: improved separation efficiency, improved concentration efficiency, shorter process times, automation, and integration into automated systems. Like centrifugation, filtration, and the other conventional methods, this present technique concentrates the collected sample prior to analysis, but with many further advantages, including but not limited to: 1) the liquid volume of the sample is quickly reduced. Unlike centrifugation, which typically takes 10 to 30 minutes to concentrate micron-sized particles, this process can be accomplished in 5 to 60 seconds for a 10 mL initial volume. Unlike conventional hollow fiber filter concentration, in which the initial sample is recycled many times through the filter taking from several minutes to hours in order to concentrate a particle such as a protein or enzyme into a volume of several milliliters, the sample is passed straight through in one pass. This results in a much smaller volume of liquid on the order of 100 to 400 microliters, or passed straight through in dead-end fashion and then extracted in a volume of liquid or foam in the range of 4 to 400 microliters. Unlike typical single-pass flat filtration, the sample remains in liquid form for transport and analysis. The detection limit for the target agent is lowered, with respect to the media originally sampled. 2) The final sample volume is reduced much further than in previously known methods, while kept in liquid form, allowing detection in devices such as multi-well plate readers that utilize small input samples. 3) The reduced-size samples can be more efficiently stored and transported by microfluidic handling methods. 4) The device can be constructed to separate particles in one pass into different size fractions for analysis for certain agents. For example, cells and spores can be concentrated separately from viruses and biological toxins. Further, the size range that is concentrated can be narrow, or "band-pass" to concentrate a small size range fraction from a complex matrix, such as an environmental sample 5) The device can be used to reduce the onboard fluid storage capacity of aerosol samplers, by recycling the cleaned liquid back to the collection cycle after the sampled particles are removed into a small volume for analysis. 6) This device is much more readily adapted to automated systems than other technologies including centrifugation, flat filtration, and other methods. The flow-through nature of the device allows for straightforward configuration into an automated detection system. 7) This device is significantly more robust in nature than new microfluidic concentration systems such as dielectrophoresis concentration systems. Dielectrophoresis systems developed by Sandia have internal flow paths of small diameters that can create significant clogging during processing of fluids with high particle concentrations. Commercially available hollow fiber filters, while possessing pores of up to a maximum of approximately 0.5 μm diameter, will take significantly longer to clog, due to the high number of pores and the tangential flow cleaning with the preferred surfactant foam. 8) The InnovaPrep system is much smaller than any commercially available liquid to liquid concentrator. Necessary components can be arranged in such a way as to take advantage of any empty space in the system being integrated. 9) The device it made almost entirely of low cost, readily available components. This significantly lowers the cost of integration and makes it more practical than other methods concentration.

An exemplary embodiment of a device according to the present subject disclosure is presented in FIGS. 1A-1C. In these figures, an exemplary device 100, which can be used for fractionation and concentration of components within a fluid, is presented. The device 100 includes a manifold portion 101, with a manifold mounting flange 111 used to connect or secure the device, and a clamp plate 102 which together serve as end pieces to the device 100, and the fluidic stack 108 are held within those end pieces. Clamping bolts 103 maintain a sealed condition for the device 100 when it is operated. Alignment pins 104 serve to maintain the structural integrity of the device and provide an easier method to put all components together. Fluid connections 105 are the ports where fluid is introduced into the device 100. Pneumatic control line 106 regulates the pressure within the device 100.

FIG. 1C shows an exploded view of a laminated multi-stage concentration cell device 100 with bolts 103 and alignment pins 104 removed for sake of clarity. The fluidic stack 108 comprises of numerous layers of hard plastic layers 121 with holes cut out in specific shapes and geometries and fluid paths etched in the surface of, and gaskets 122 enclosing filter portions 123. The device 100 is constructed by compressing alternating layers of plastic 121 and filter media 123 between two fluidic blocks 122 which allow the cell to interface with the rest of the fluidic system. This type of cartridge may be constructed using the method shown or may be constructed using bonding and construction techniques that are commonly used in microfluidic device construction. An exemplary cartridge is shown having 5 filters. In this case, the 5 membrane filters could be made up with filter types, or similar filter types to that shown below.

Filter 1—6 μm track-etched polycarbonate membrane filter for large particle removal
Filter 2—Affinity based filter for removal of humics
Filter 3—0.4 μm track-etched polycarbonate membrane filter for bacteria capture
Filter 4—0.02 μm block copolymer membrane filter for virus and nucleic acid capture
Filter 5—10 kD block copolymer membrane filter for protein capture In this way the system would produce fractions of target particles containing the following particle types, with reduced numbers or concentrations of interfering particles or humics.

Whole Bacteria
Viruses and free nucleic acids
Proteins

FIG. 7A shows a cross sectional view of a two stage filter stack with integral filter supports. This cell is constructed by laminating several layers of different material together to create fluid channels. The components are (1) ridged plastic substrate in which fluid paths are etched, (2) soft plastic substrate which functions as a gasket creating a gas and liquid tight seal between layers, (3) filtration media, (4) filter support ridges, and (5) fluid paths connecting one filter stage to the next such that the permeate of the first stage filter becomes the sample of the second stage filter.

FIG. 7B shows a cross sectional view of a five stage filter stack. This cell is also constructed by laminating layers of material together; the filter media is arranged such that the sample travels through all five filter stages in a single step, starting with the largest pore diameter filter and ending with the smallest. The components are (6) the sample inlet port, (7) soft or ridged substrate sealing the layers together and creating fluid channels, (8) filtration media, (9) the permeate port. (10) shows the direction of the sample flow.

Figure 1B:
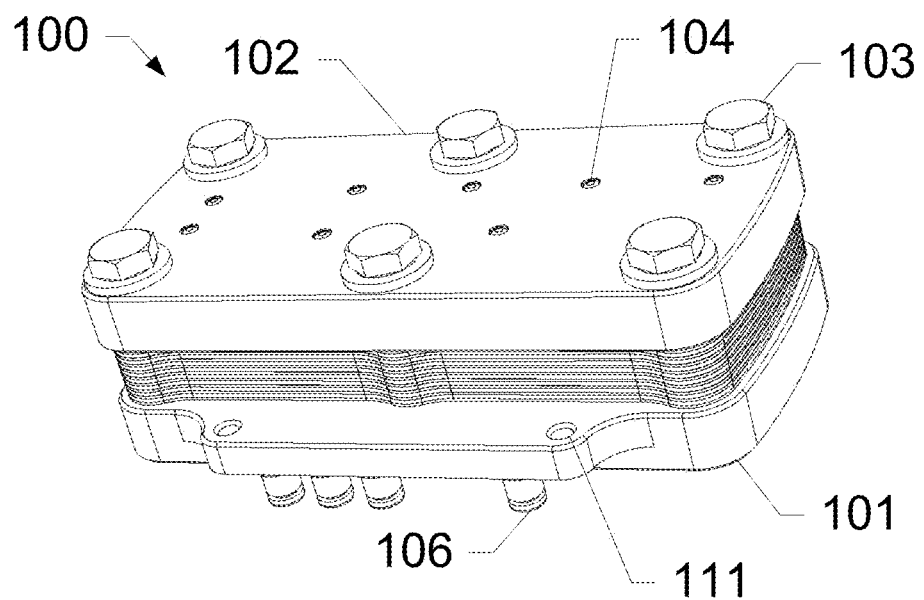
FIG. 1B shows a clamp portion of a five stage fluidics device, according to an exemplary embodiment of the present subject disclosure.
Figure 1C:
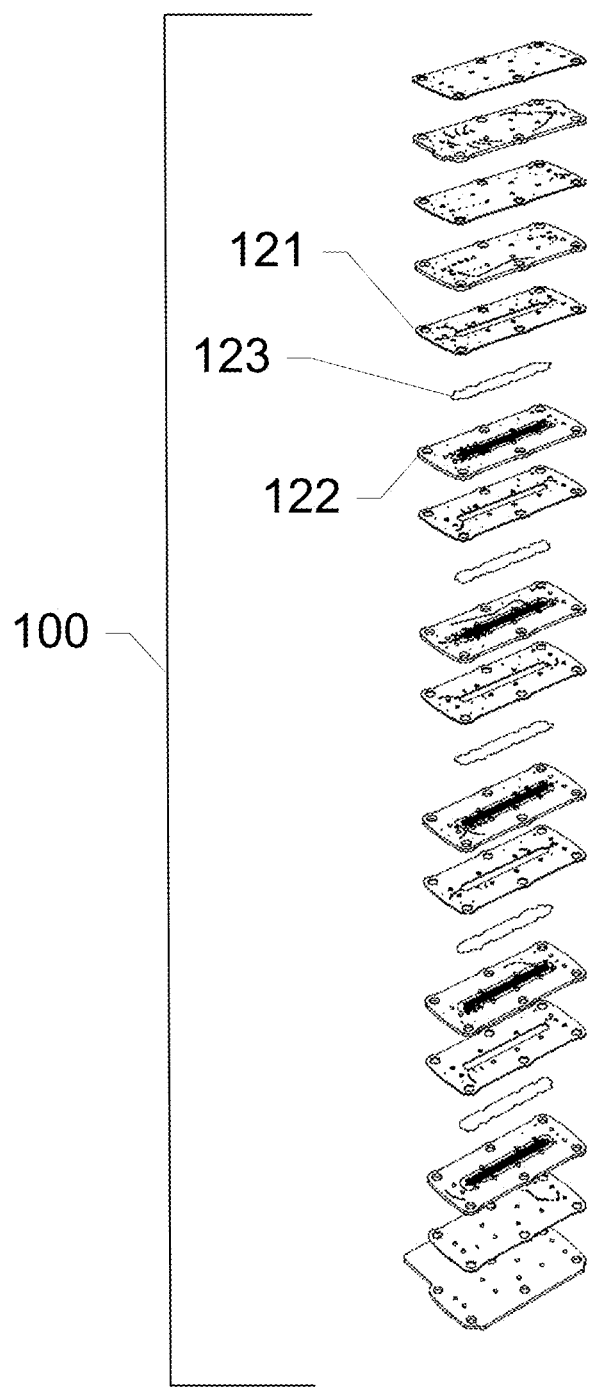
FIG. 1C shows an exploded view of a five stage fluidics device, according to an exemplary embodiment of the present subject disclosure.

It should be noted that although the exemplary embodiment shown in FIGS. 1A-1C includes five layers of filters, any number is possible, and the technique to make and use the device will be similar, and understood by one having ordinary skill in the art when considering the present disclosure.

Figure 2:
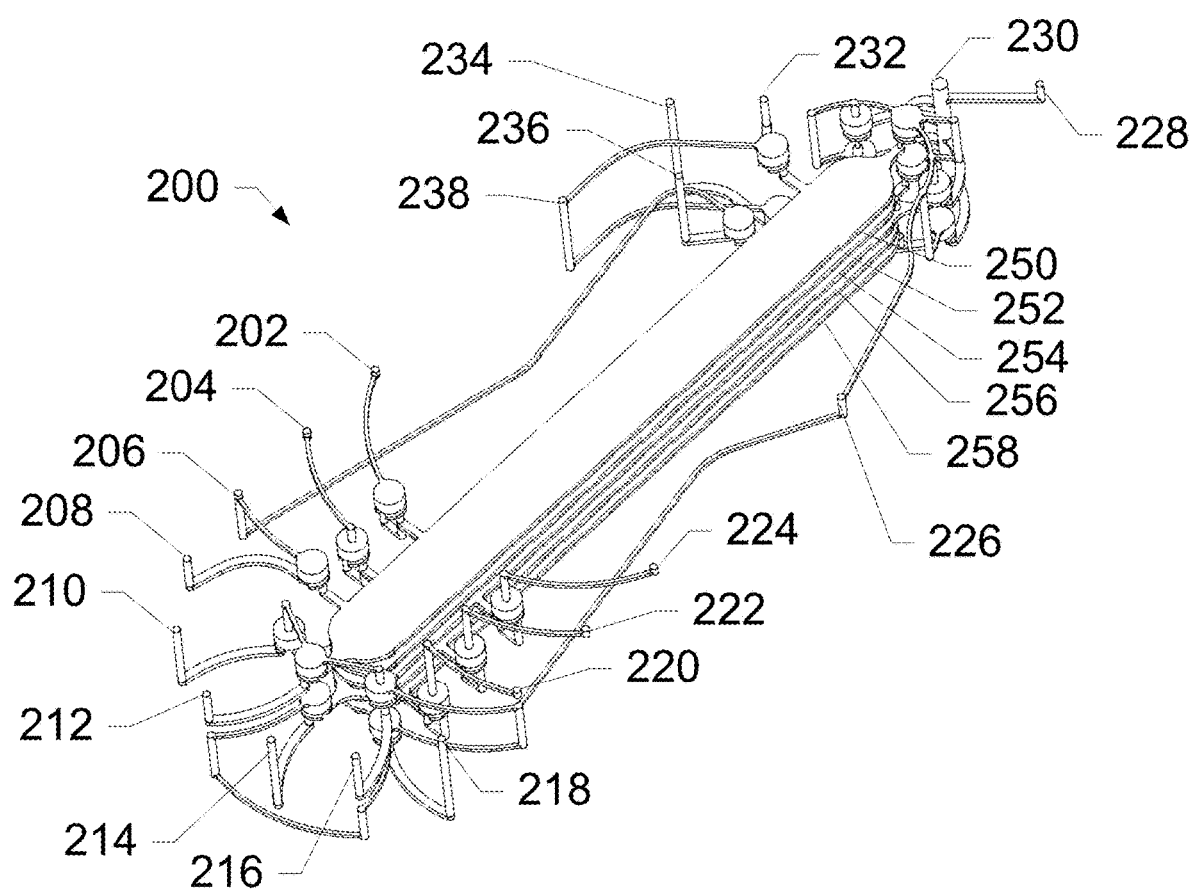
FIG. 2 shows an internal fluid volume view of a five stage fluidics device, according to an exemplary embodiment of the present subject disclosure.

Once the device 100 is properly aligned with alignment pins 104 and securely fastened with bolts 103, a fluidic internal volume 200 is created with numerous chambers, passageways and connections. Such internal fluid volume 200 is shown in FIG. 2. It should be noted that this internal fluidic volume is created as a result of the laser cut passageways of the various hard plastic layers 121, gaskets 122, and filters 123 used in the fluidic stack 108.

Internal fluidic volume 200 shows various paths for the fluidic stack 108 assembly for a five stage concentrator. 202, 204 and 206 are pneumatic control lines, and used to control filter stage 1 bypass valve (humic acid removal) 202, Filter stage 2 bypass valve (prefilter) 204, and decontamination isolation valves 206.

Various fluid lines include the decontamination fluid outlet port 208, the filter stage 3 retentate port (concentration stage 1) 210, the filter stage 1 retentate port (Humic acid removal) 212, the filter stage 4 retentate port (concentration stage 2) 214, the filter stage 2 retentate port (Prefilter) 216, and the filter stage 5 retentate port (concentration stage 3) 218.

Further pneumatic control lines include the filter stage 5 bypass valve (Concentration stage 3) 220, filter stage 4 bypass valve (concentration stage 2) 222, filter stage 3 bypass valve (concentration stage 1) 224, and the master filter isolation valve 226.

Further fluid lines include the gas flush port 228, the foam injection port 230, the sample inlet port 232, the sample outlet port (permeate) 234, and the decontamination fluid inlet port 236. Part of the pneumatic control line is the feed/permeate isolation valve 238. Finally, the various filter stages include filter stage 1 250, filter stage 2 252, filter stage 3 254, filter stage 4 256, and filter stage 5 258.

Figure 3:
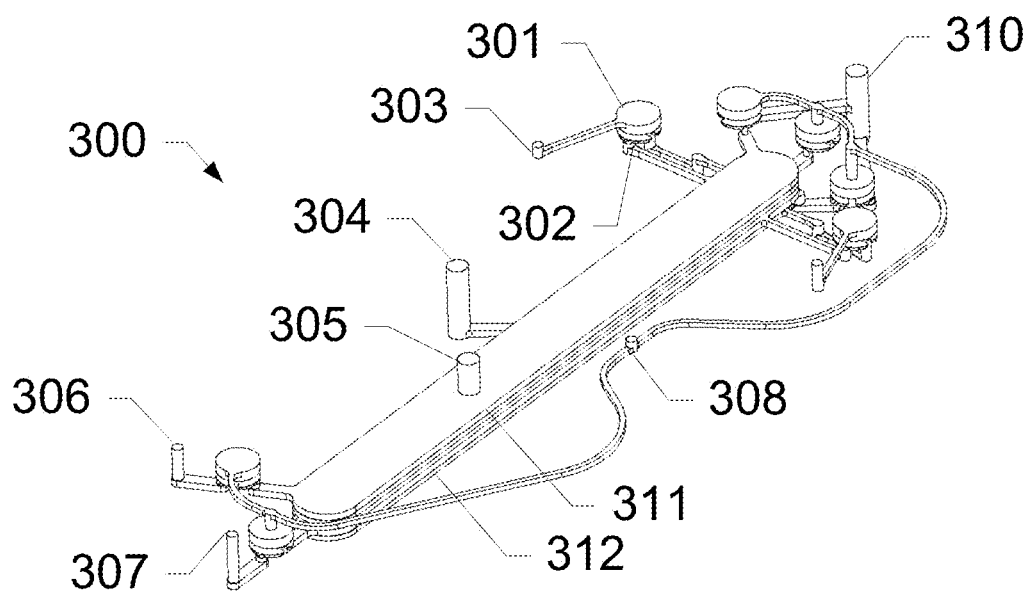
FIG. 3 shows an internal fluid volume view of a two stage fluidics device, according to an exemplary embodiment of the present subject disclosure.
Figure 4:
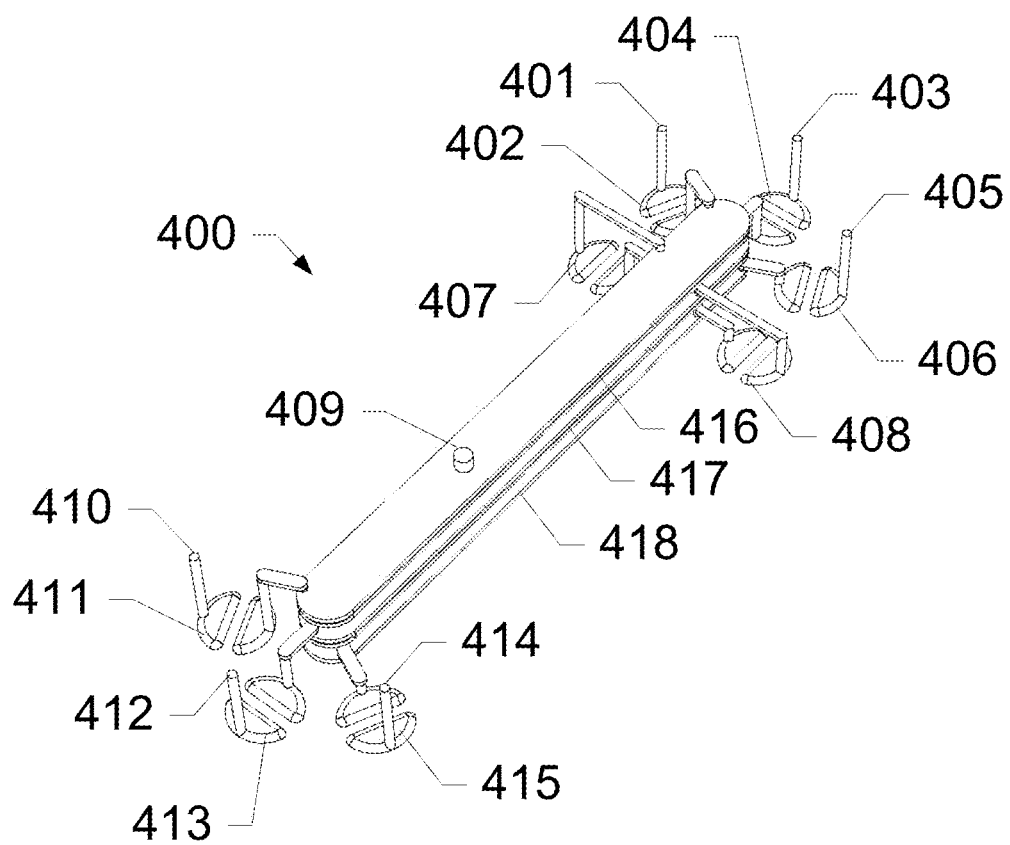
FIG. 4 shows an internal fluid volume view of a three stage fluidics device, according to an exemplary embodiment of the present subject disclosure.

All of the components and internal fluid channels for the five stage fluidic stack shown in FIG. 2 work together in the manner as described in further detail below. It is noted that the five stage fluidic stack shown in FIG. 2 is merely exemplary, and that the present disclosure is not limited to such an exemplary embodiment. For example, a two stage fluidic internal volume is shown in FIG. 3 and a three stage fluidic internal volume is shown in FIG. 4. Other numbers are also possible and within the purview of one having ordinary skill in the art.

For sake of completeness, the components of the two stage fluidics internal volume 300 include:
301 Microvalve control pneumatic control diaphragm (7 shown)
302 Micro fluidic valve (7 shown)
303 (pneumatic control line) Filter stage 1 bypass valve
304 (Fluid line) Sample outlet (Permeate)
305 (Fluid line) Sample inlet (Feed)
306 (Fluid line) Filter stage 1 retentate
307 (Fluid line) Filter stage 2 retentate
308 (pneumatic control line) Master filter isolation valve
309 (pneumatic control line) Filter stage 2 bypass valve
310 (Fluid line) Foam injection port
311 Filter stage 1
312 Filter stage 2

For sake of completeness, the components of the three stage fluidics internal volume 400 include:
401 Stage 1 foam inlet
402 Stage 1 foam microvalve
403 Stage 2 foam inlet
404 Stage 2 foam microvalve
405 Stage 3 foam inlet
406 Stage 3 foam microvalve
407 Filter stage 1 bypass valve
408 Filter stage 2 bypass valve
409 Sample inlet (feed)
410 Stage 1 retentate outlet
411 Stage 1 retentate valve
412 Stage 2 retentate outlet
413 Stage 2 retentate valve
414 Stage 3 retentate outlet
415 Stage 3 retentate valve
416 Filter stage 1
417 Filter stage 2
418 Filter stage 3

Figure 5:
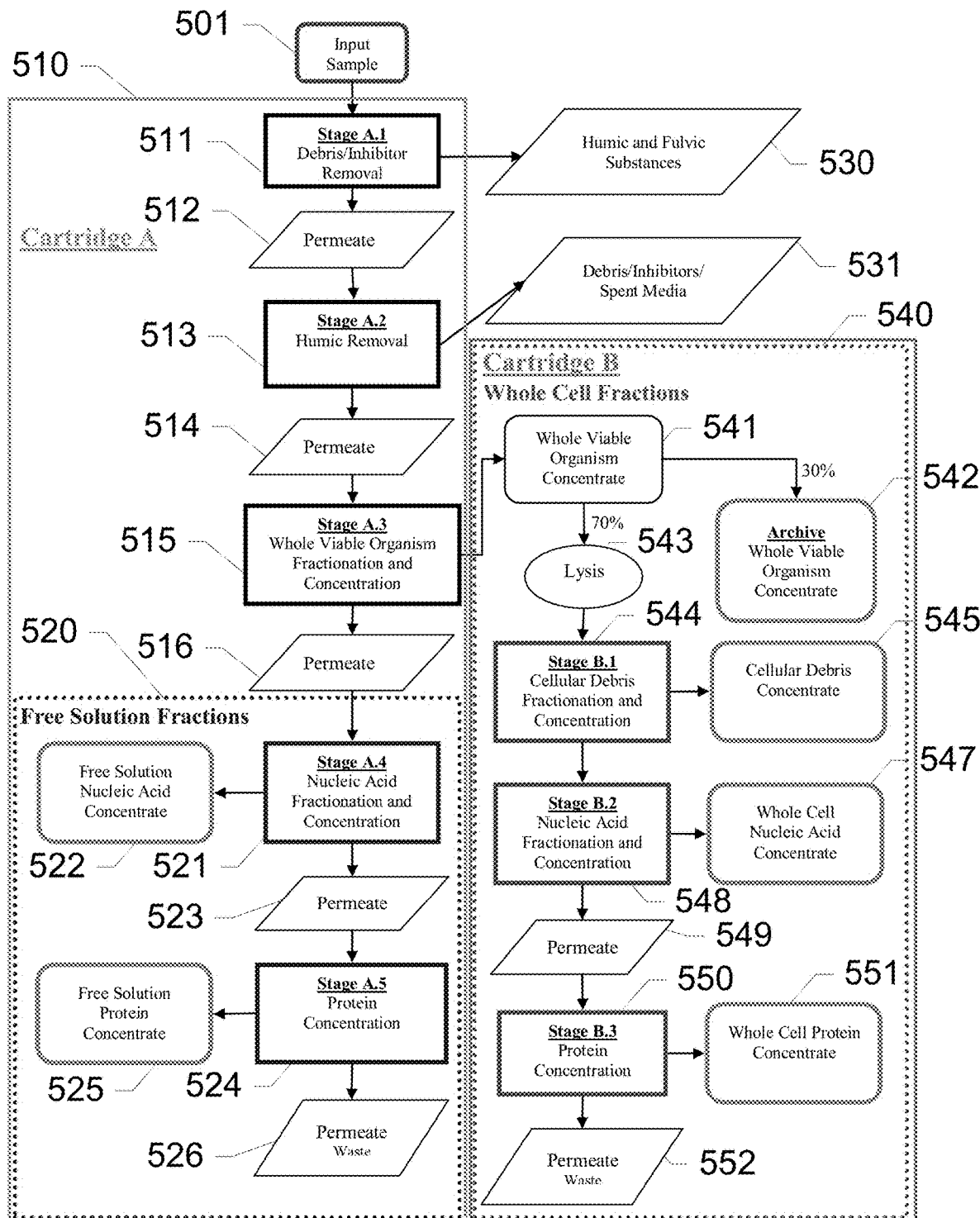
FIG. 5 shows a flow chart for fractionation and concentration, according to an exemplary embodiment of the present subject disclosure.

A process flow diagram for an exemplary system according to the present subject disclosure is presented in FIG. 5. The orange boxes 522, 525, 542, 545, 547, 551 contain the final six concentrated fractions that will be recovered from the input sample shown in the red box 501. Two fractionation/concentration fluidics cartridges 510 and 540 will be used to produce the six fractions 522, 525, 542, 545, 547, 551. Cartridge A 510 will separate the input sample into fractions containing whole cells 514, free nucleic acids 522, and free proteins 525. A portion of the whole cell fraction 514 from Cartridge A 510 will be lysed and then Cartridge B 540 will be used to separate the whole cell lysate 543 into fractions containing cell debris 545, nucleic acids 547, and proteins 551. Cartridge A 510 separations will be performed with stages A.1 511, A.2 513, A.3 515, A.4 521, and A.5 524. Cartridge B 540 will house stages B.1 544, B.2 548, and B.3 550. Prior to Cartridge A 510, a novel, replenishable media column loaded with Polyvinylpolypyrrolidone (PVPP) media will be used to remove humic substances while allowing target materials to pass. Stage A.1 511 will use a large pore membrane to remove environmental debris and inhibitors 530, including large particulate matter, from the input sample. Stage A.2 513 will be a novel, replenishable Polyvinylpolypyrrolidone (PVPP) Sol-gel membrane used to remove humic substances 531 while allowing target materials to pass. Stage A.3 515 is used to capture whole viable organisms. A portion of this fraction is then archived for later analysis and a portion is lysed for rapid detection. The permeate fluid from this stage will contain free solution nucleic acids and free solution proteins which are subsequently separated into a nucleic acid fraction and a protein fraction with Stages A.4 521 and A.5 524, respectively. The lysed fraction of whole viable cells, to be used for rapid detection, is separated into three fractions containing cellular debris, nucleic acids and proteins with Stages B.1 544, B.2 548 and B3 550, respectively. The various permeates 512, 514, 516, 523, 549 are shown to indicate the remaining substances of the process. Permeate waste 526 and 552 indicate the end result of the processes of cartridge A 510 and cartridge B 540, respectively.

Figure 6:
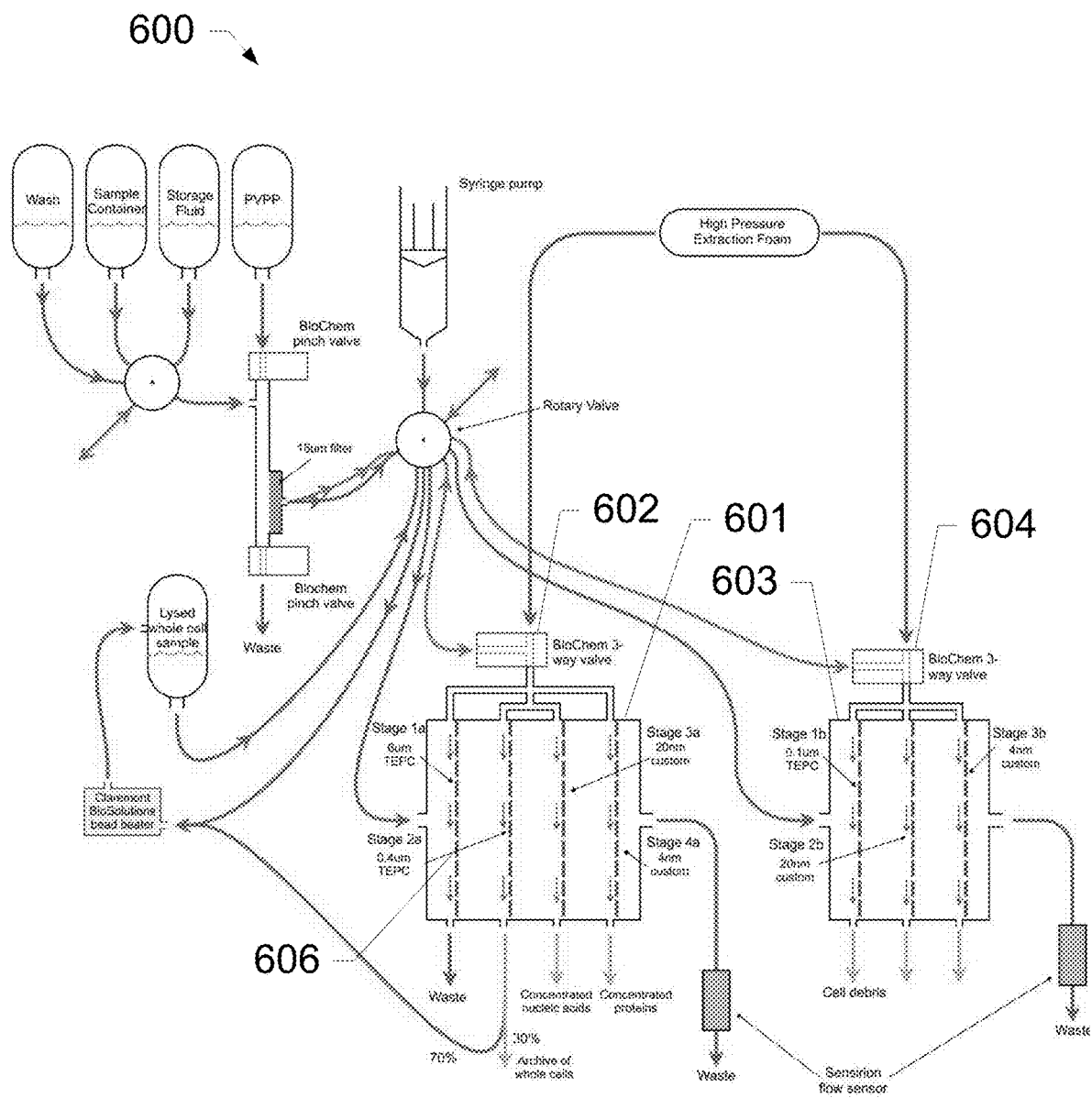
FIG. 6 shows a two cartridge system, according to an exemplary embodiment of the present subject disclosure.

FIG. 6, in conjunction with FIG. 5, provides a flow schematic of a layout of an exemplary version of a two cartridge system 600. FIGS. 5 and 6 should be considered jointly for the proceeding discussion. During operation, a sample with a volume of 1 mL to 50 mL is fed into the sample input reservoir. A processing cycle is then initiated. The first step is preparation of the cartridges 601, 603 for processing using a novel vacuum startup method. Because the membranes 606 are hydrophilic in nature and are wet for every sample processed after the first, startup requires that air be evacuated from the system 600 so that the liquid samples can be brought into contact with the membranes. It should be noted that only one membrane 606 is pointed out in the figure for sake of clarity, but multiple membranes are shown. Pulling negative pressure on each stage within the cartridges 601, 603 performs this action. Pneumatic valves within the cartridges 601, 603 are activated to allow a vacuum to be applied through a three-way valve 602, 604 at the top of each cartridge, respectively. When a sufficient vacuum has been achieved, the valves are closed so that negative pressure is captured within the cartridge. The entire vacuum startup process is anticipated to take less than 20 seconds to perform.

When the vacuum startup is complete the sample is processed through a PVPP column for humic removal followed by Cartridge A 520, 601. Fluid then flows through all four stages of Cartridge A 520, 601 in a single pass. Because the interstitial space between membranes 606 is small (less than 300 µL) and because the membranes are arranged in series the total hold-up volume in Cartridge A 520, 601 will be less than 1.5 mL with a processing rate that is limited primarily only by the slowest membrane in the cartridge. Total time to process a 10 mL sample through the humic removal column and Cartridge A 510, 601 is approximately 10 minutes. When the all of the liquid sample passes through the Stage A.1 511 membrane the system will lock up since air will not pass through a wet hydrophilic membrane. A Liquid Flow Switch is then used to determine when the system has locked up and air pressure is applied to the next stage so that liquid can be pushed through the next membrane filter. This process is continued until all the liquid has been evacuated from the system.

When the entire sample has been processed each Stage is extracted simultaneously. By performing the extraction process simultaneously, pressures across each membrane are balanced and flow through the membranes does not occur since the pressure is equal on both sides. This process provides for the best possible concentration efficiencies with the smallest resulting extraction volume. The extraction process takes place by opening and closing a single extraction fluid valve connected, through internal cartridge fluidics, to each stage. The valve is opened for a short period of time (15 to 50 msec) to allow extraction fluid to be dispensed rapidly into the interstitial space between each membrane. Once dispensed the extraction fluid quickly forms wet, viscous foam that travels the length of the membrane and is dispensed into separate capture reservoirs for each stage.

Concentrates released from Cartridge A 510 will include fractions containing environmental waste debris for disposal, whole cells, free nucleic acids, and free proteins. The whole cell concentrate from Cartridge A 510 will be split into an archived sample and a sample available for secondary processing. The sample available for secondary processing is then processed using a flow-though mechanical cell lysis system. A wet foam elution flush is performed post-lysis to ensure highly efficient and rapid removal of lysed material from the lysis system. The subsequent volume of approximately 1 mL of lysed material is then be processed in Cartridge B 540.

Cartridge B 540 operation will essentially be identical to that of Cartridge A 510 with the exception that it will only have three membrane stages. In Stage 1 544 the cellular debris created during the lysis process will be removed. Stage 2 548 will capture nucleic acids. Stage 3 will capture proteins 550.

Figure 8A:
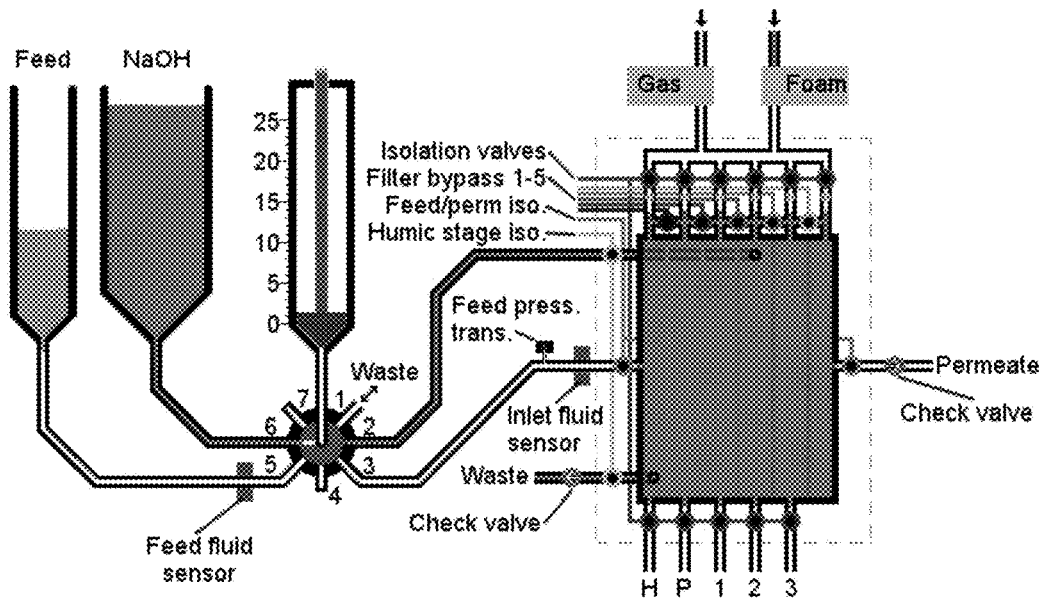
FIGS. 8A-8X show a flow chart with detailed steps of a process for fractionation and concentration, according to an exemplary embodiment of the present subject disclosure.
Figure 8B:
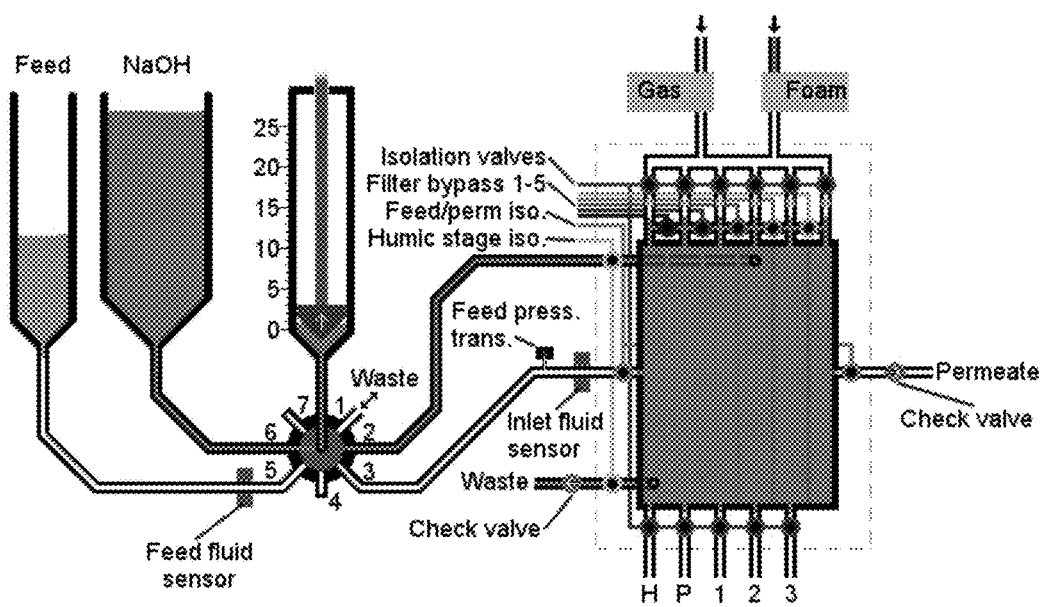
Figure 8C:
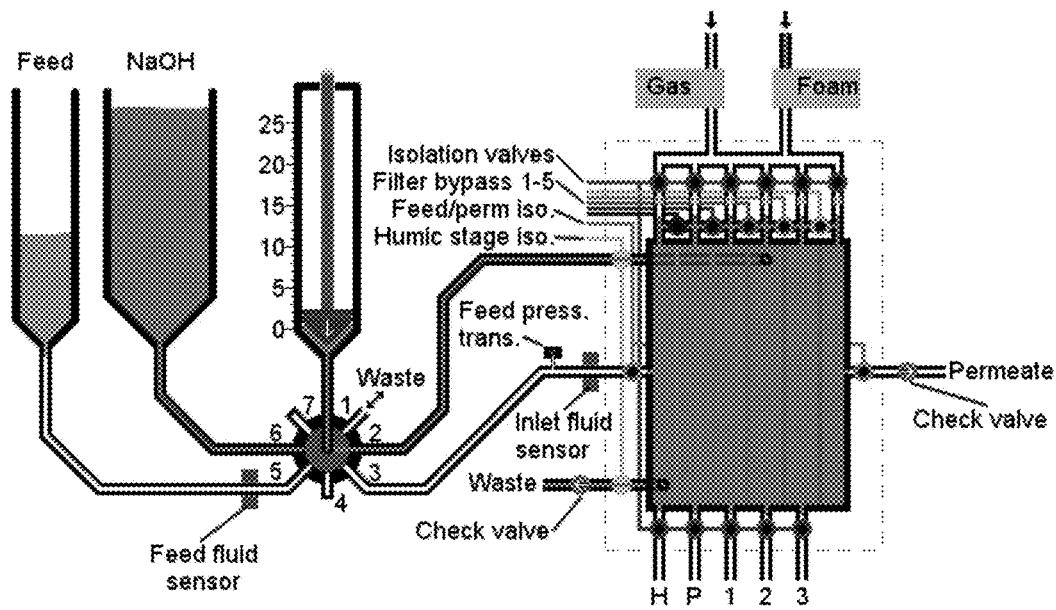
Figure 8D:
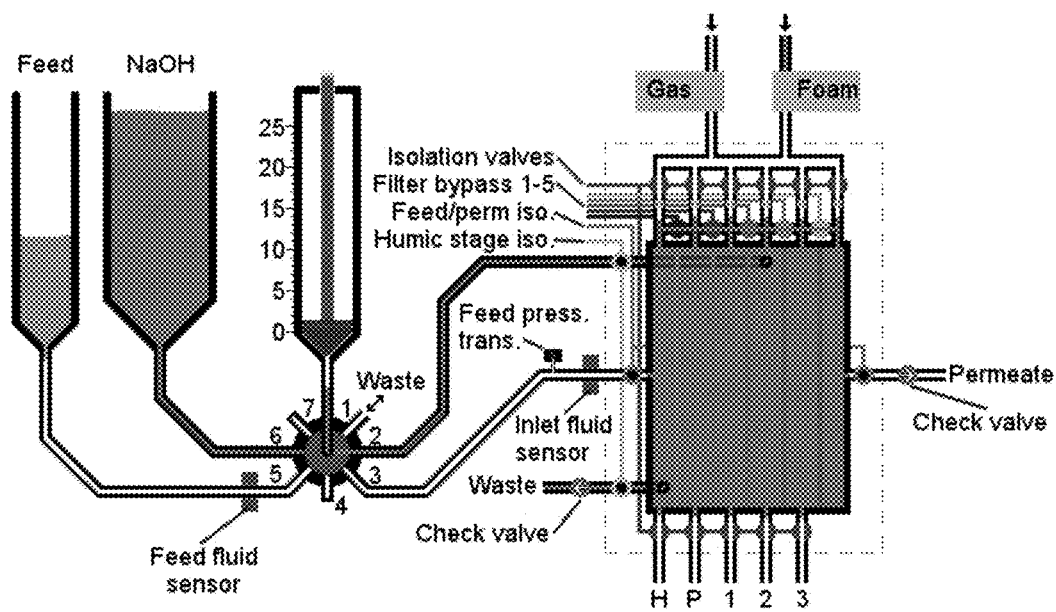
Figure 8E:
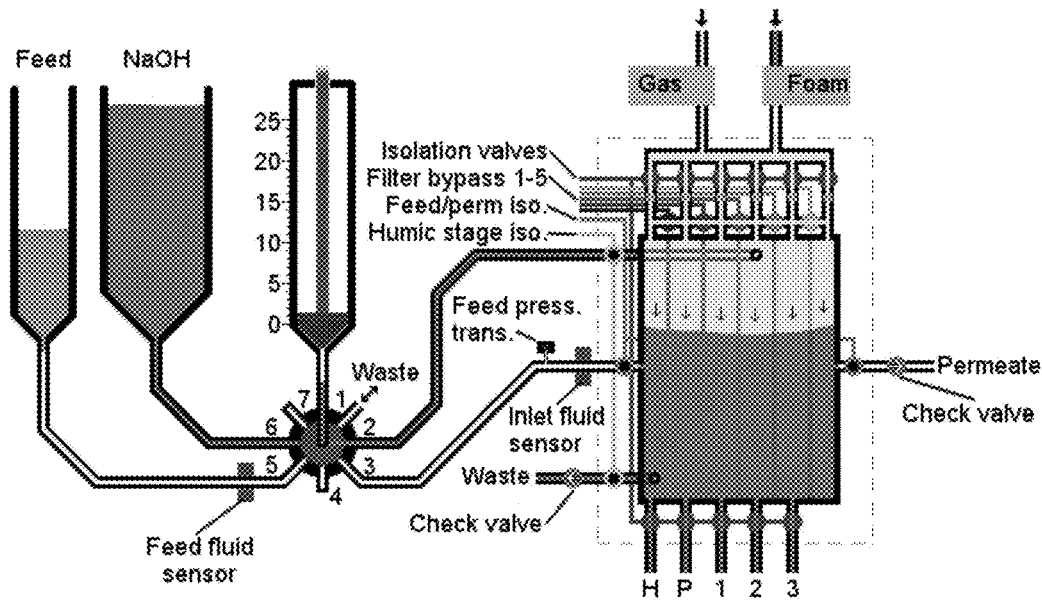
Figure 8F:
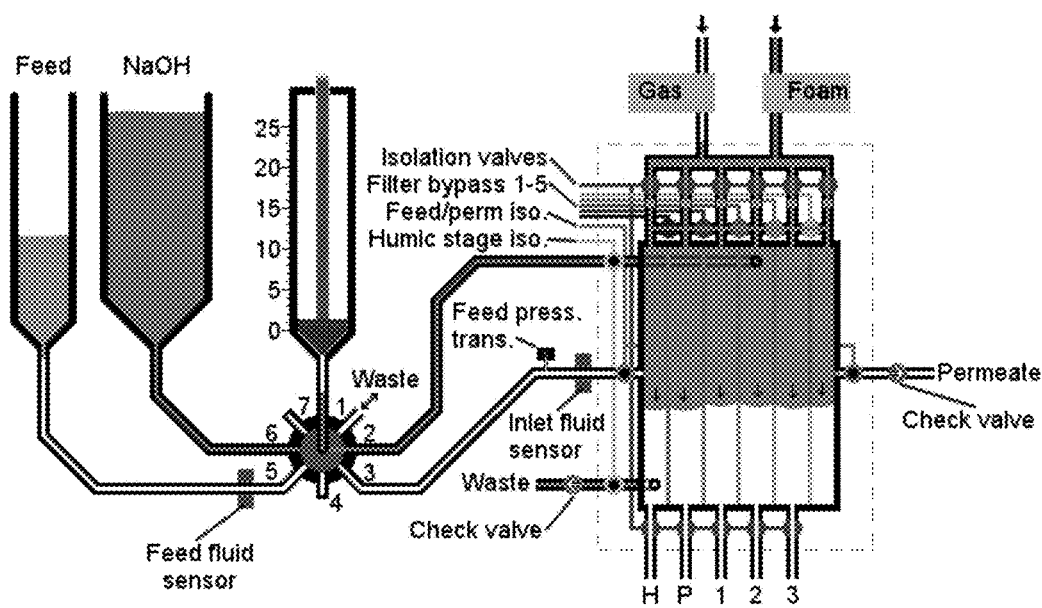
Figure 8G:
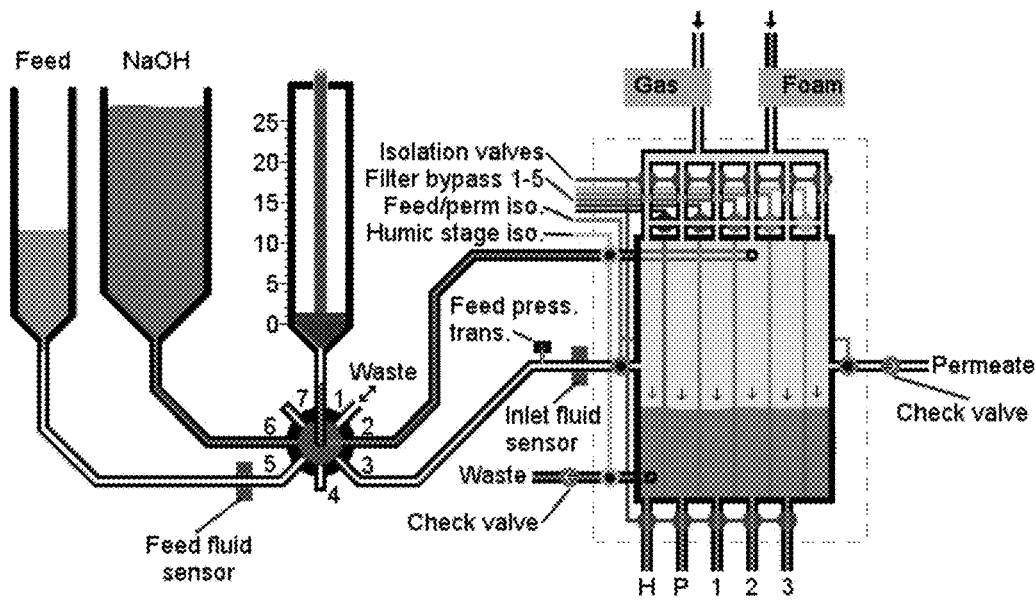
Figure 8H:
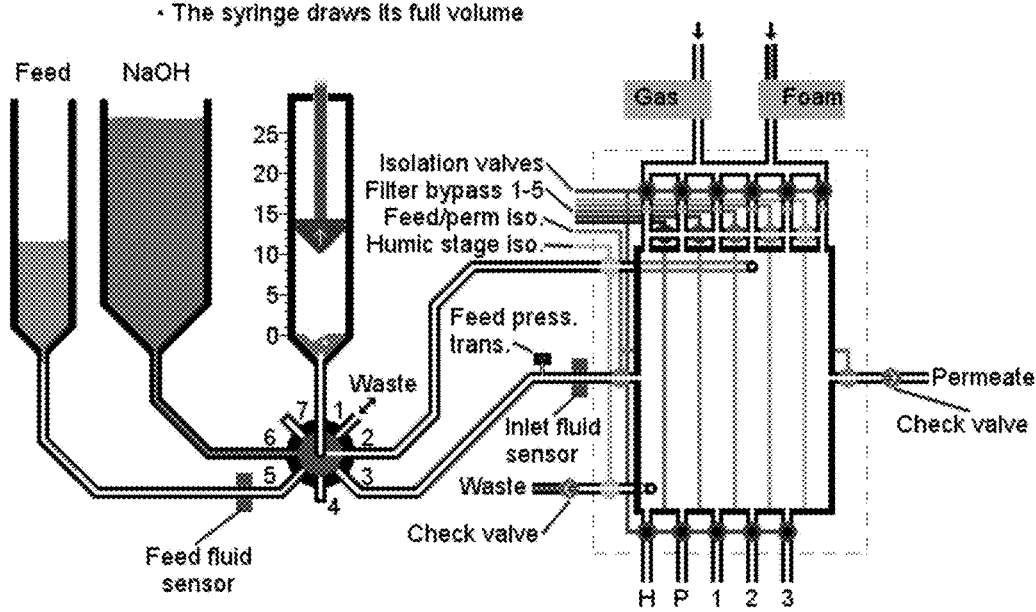
Figure 8K:
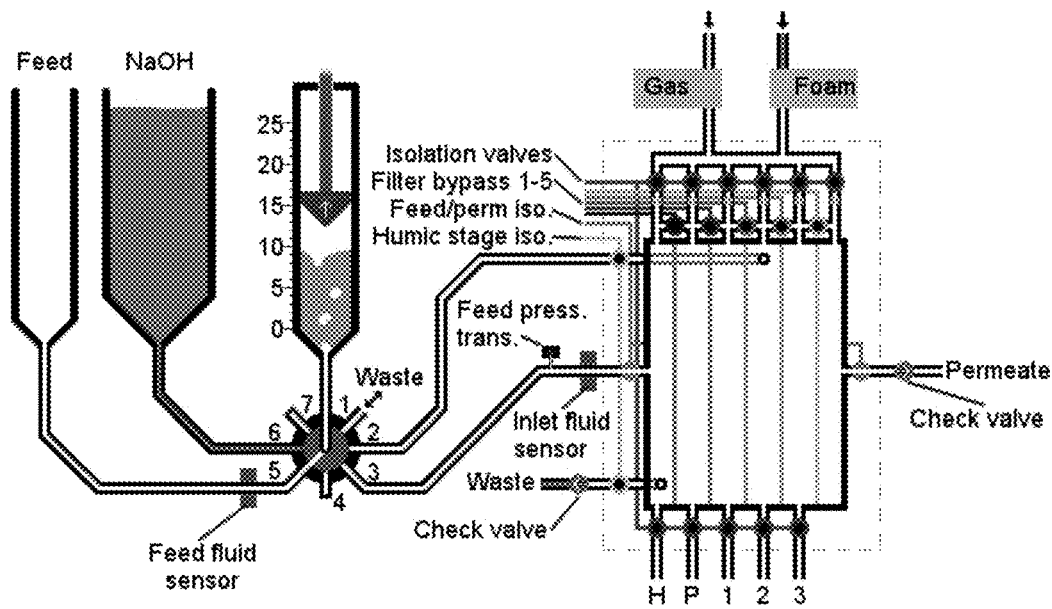
Figure 8L:
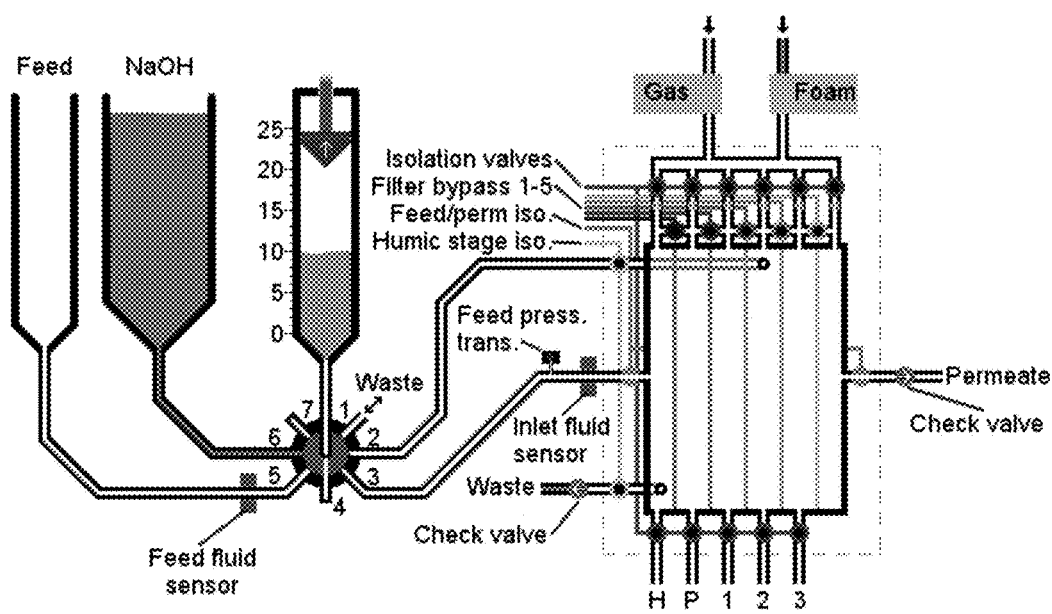
Figure 8M:
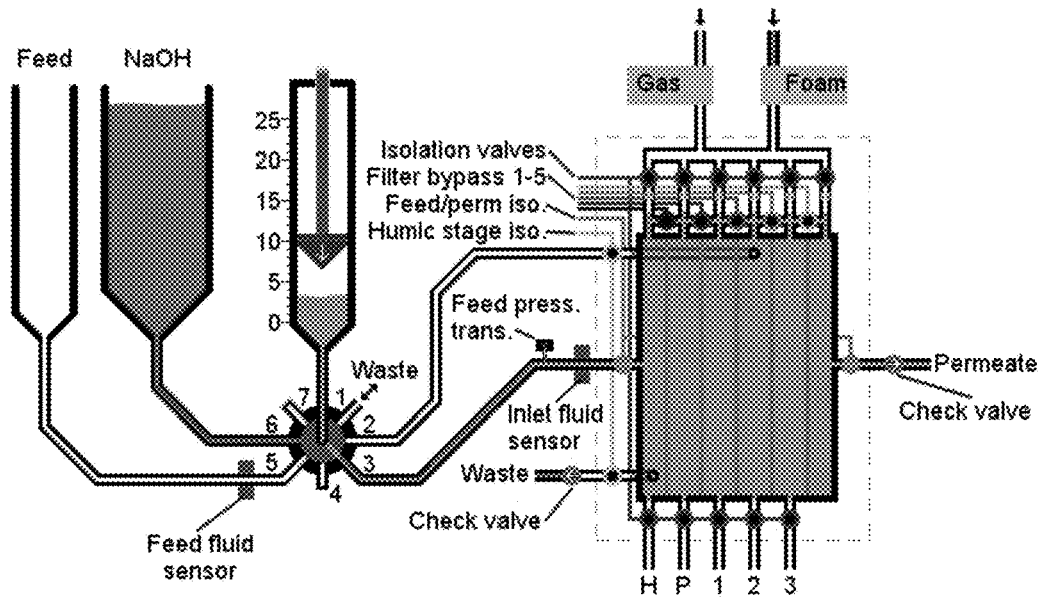
Figure 8N:
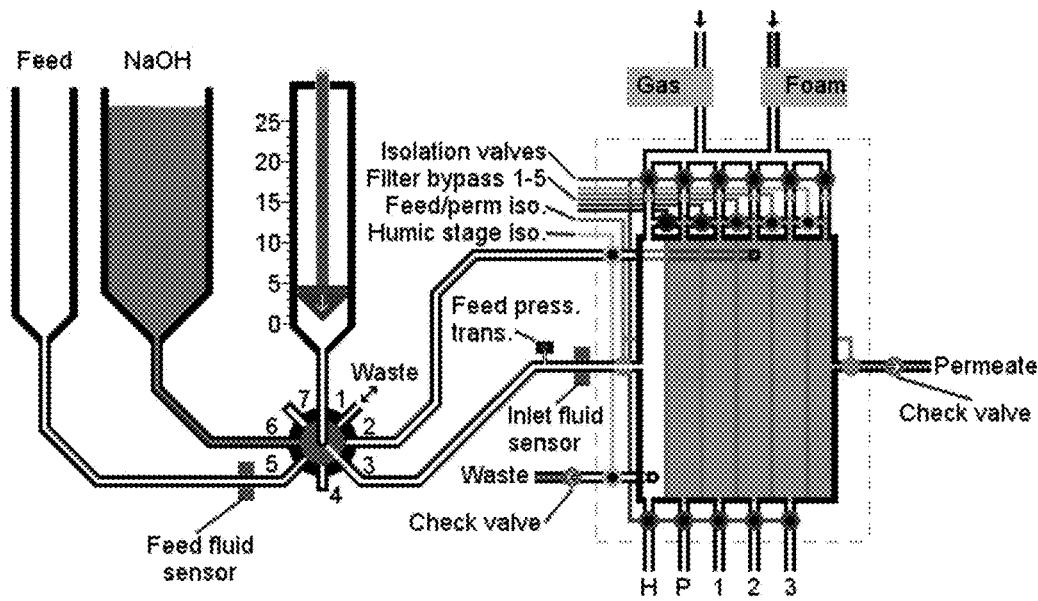
Figure 8O:
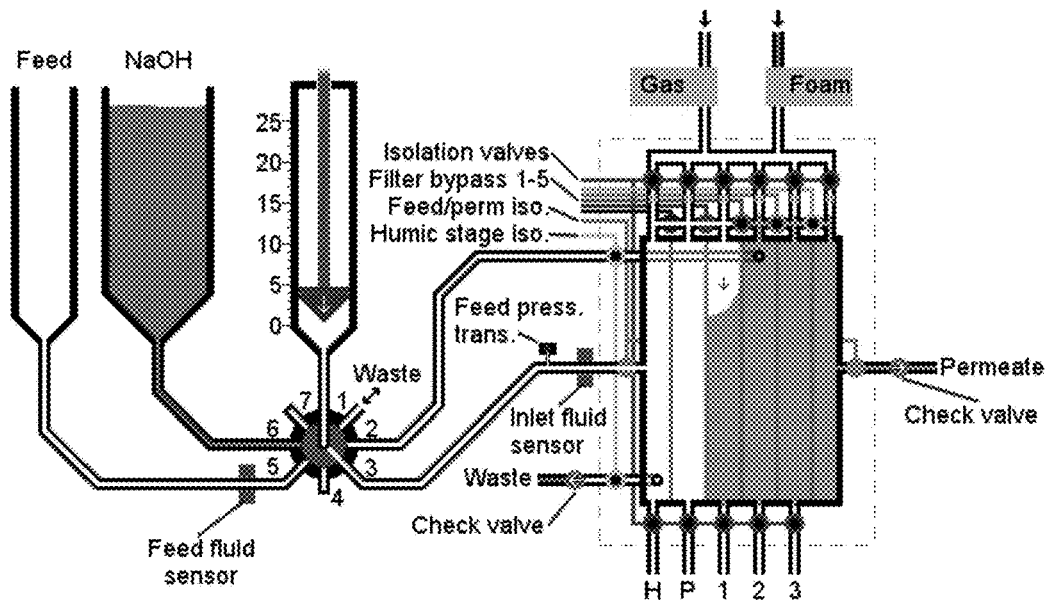
Figure 8P:
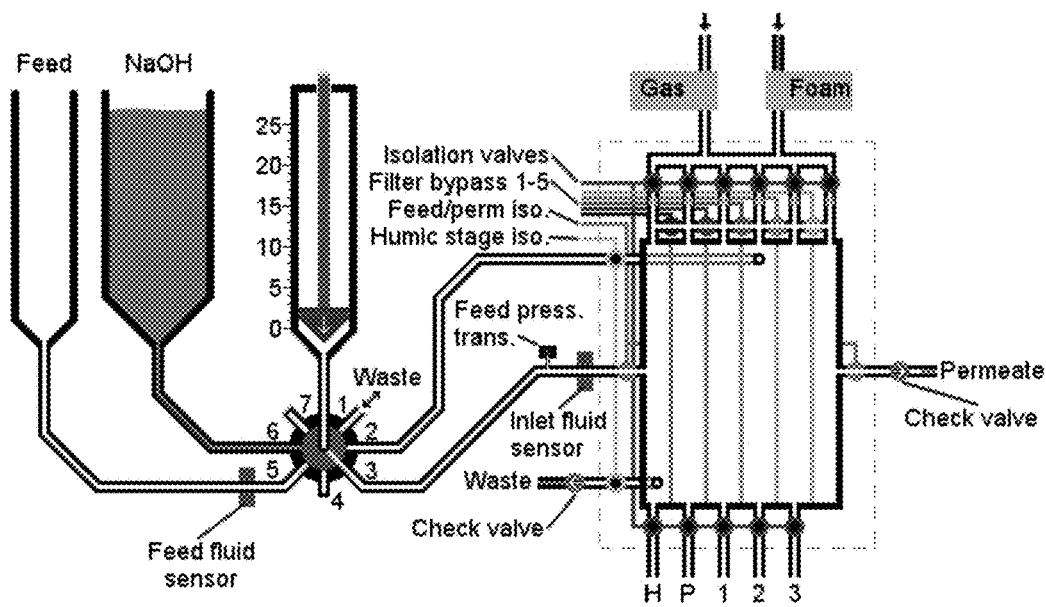
Figure 8Q:
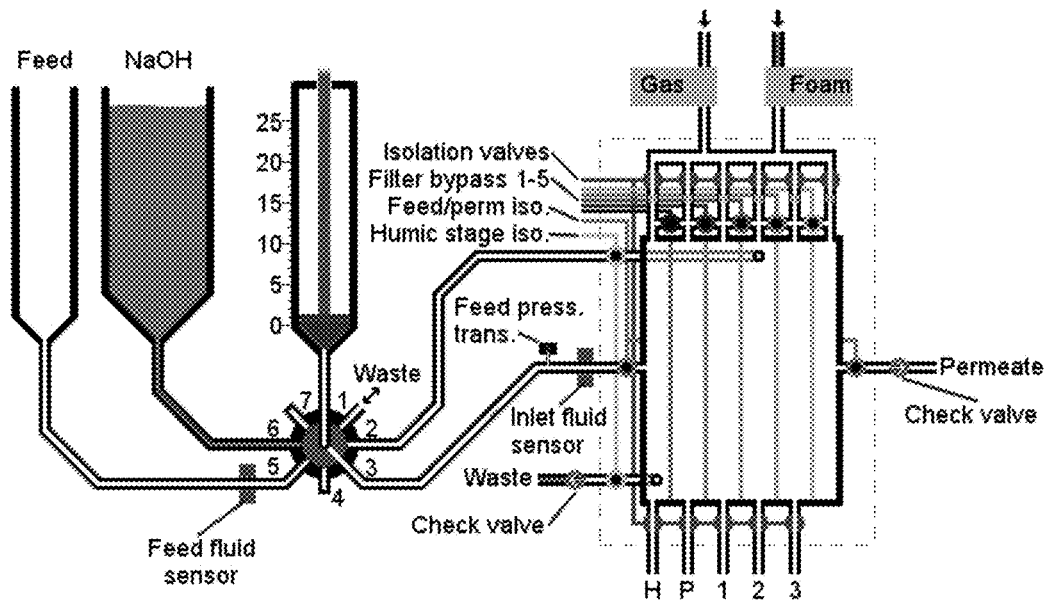
Figure 8R:
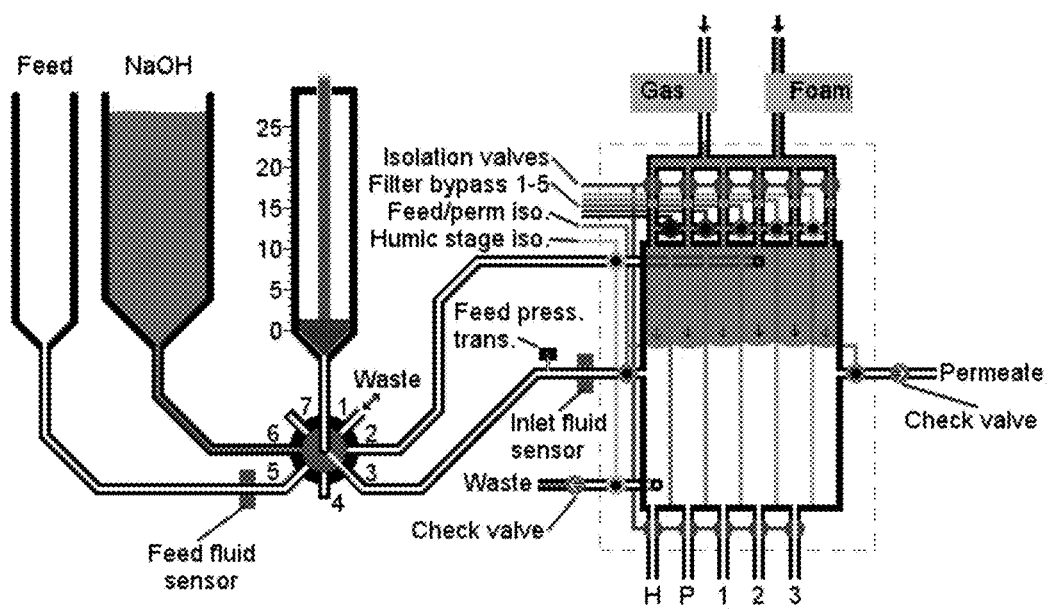
Figure 8U:
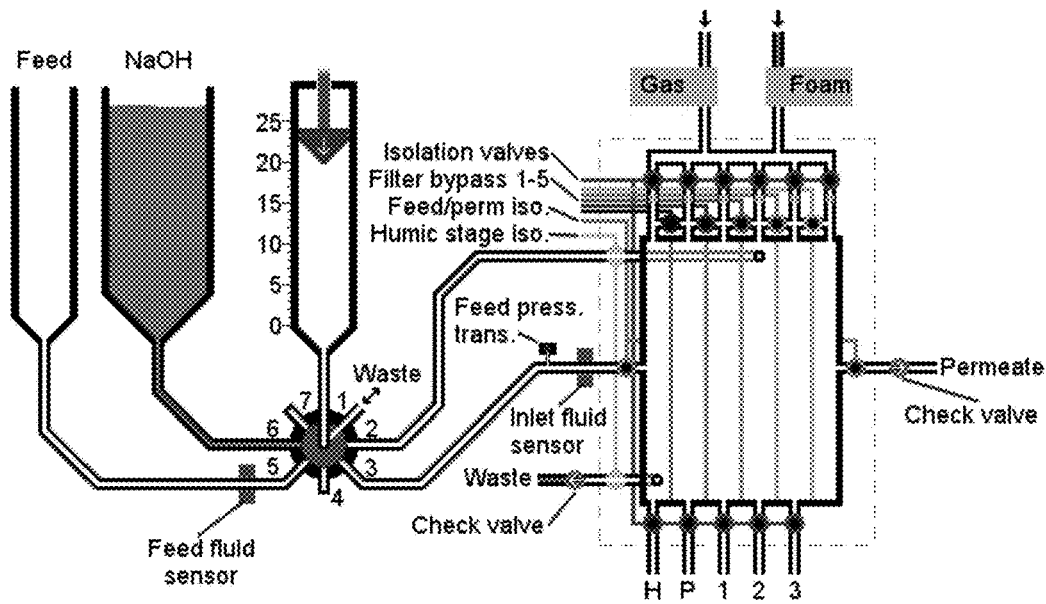
Figure 8V:
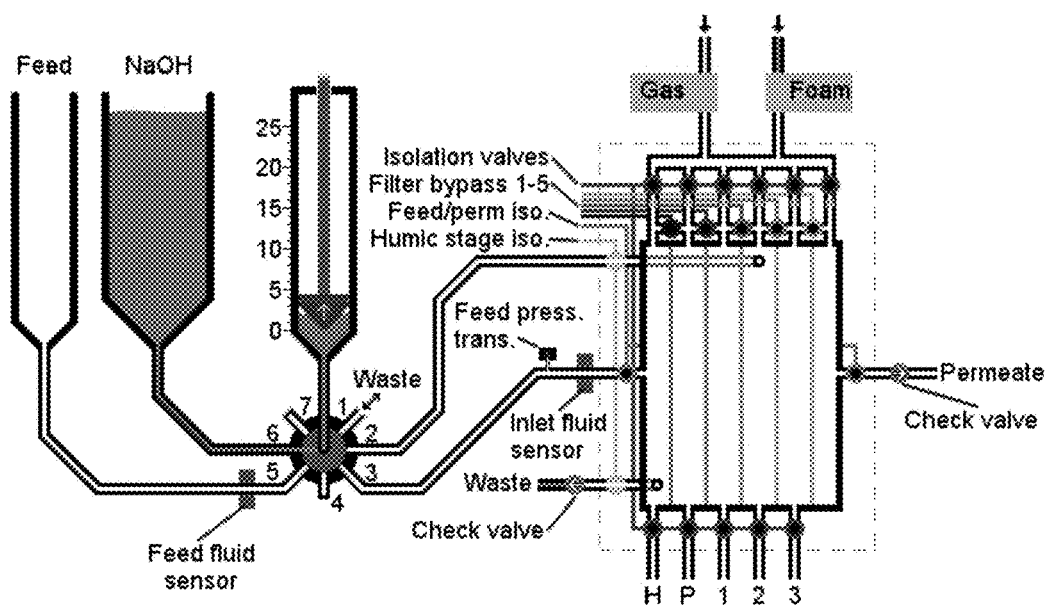
Figure 8W:
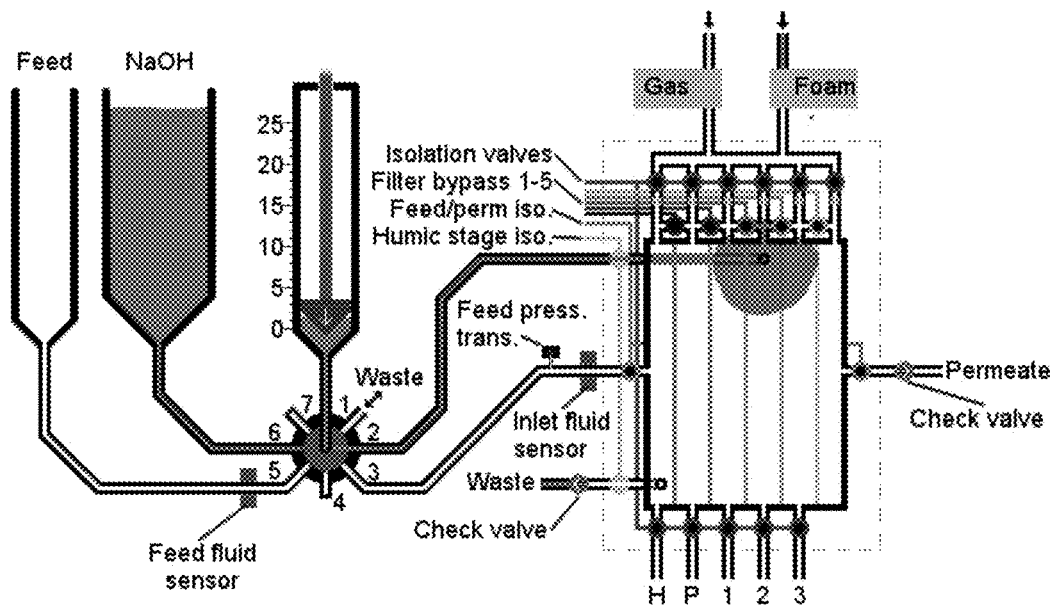
Figure 8X:
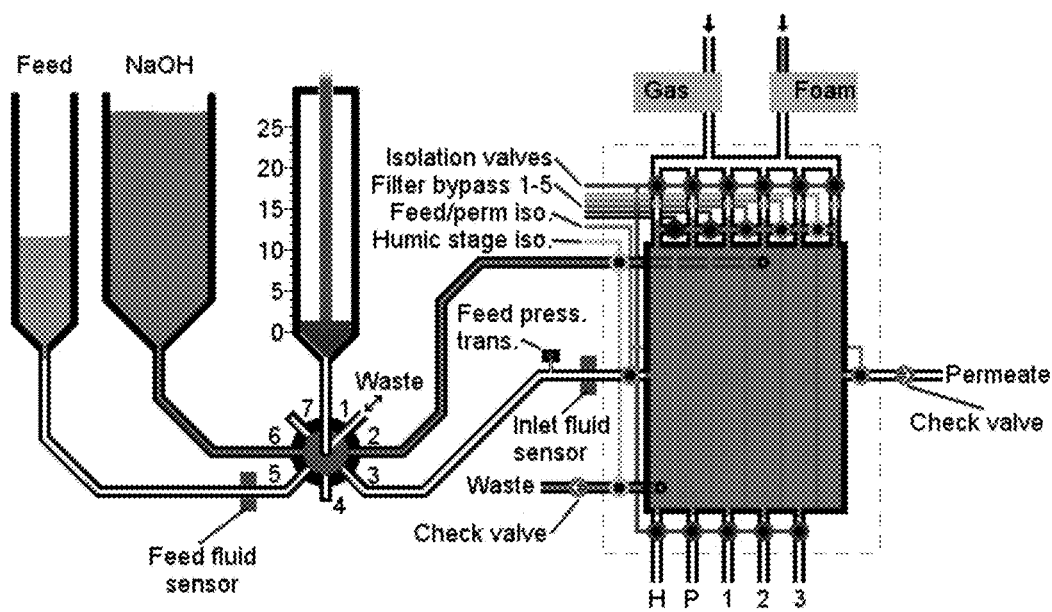

A detailed 24-step process diagram for a single cartridge fractionation/concentration instrument operation is provided in FIGS. 8A-8X. The figures clearly demonstrate the action at each step. They will be summarized here.

The initial state is shown in FIG. 8X as the conclusive step, and indicates that:
All valves are closed
Syringe is homed
Rotary valve is at position 1 (waste)
The cell is filled with NaOH storage solution
The sample has been placed in the feed reservoir
Step 1 is shown in FIG. 8A and indicates that:
The user is prompted to: "Place a waste container under the retentate ports" and press "Ok"
The rotary valve rotates CW to position 6 (NaOH reservoir)
Step 2 is shown in FIG. 8B and indicates that:
The syringe draws 3 mL of NaOH
Step 3 is shown in FIG. 8C and indicates that:
The Rotary valve rotates CCW to position 2 (NaOH inlet)
The Humic Stage Iso. valves open
The syringe slowly pushes all 3 mL of NaOH through the cell (~6 mL/min)
Step 4 is shown in FIG. 8D and indicates that:
The syringe completes its stroke
The following valves change state simultaneously:
Bypass Valves 1-5 open
The isolation valves open
The Humic Stage Iso. valves close
Step 5 is shown in FIG. 8E and indicates that:
The Gas Valve pulses to force the NaOH out the retentate ports
Step 6 is shown in FIG. 8F and indicates that:
The foam valve pulses several times to rinse the cell
Step 7 is shown in FIG. 8G and indicates that:
The Gas Valve pulses to push out the rest of the foam
Step 8 is shown in FIG. 8H and indicates that:
The user is prompted to: "Place a sample container under the retentate ports" and press "Ok"
The following valves change position simultaneously:
The Isolation Valves close
The Feed/Perm Iso. Valves open
The Humic Stage Iso. Valves open
The syringe draws its full volume
Step 9 is shown in FIG. 8I and indicates that:
Diagnostic: The cell should now be at a full vacuum, from now until Step 12, the pressure should not increase by a significant amount. The user should be prompted if it is beyond the limit.
The following valves change position simultaneously:
Filter Bypasses 1-5 close
Humic Stage Iso. Valves close
Rotary valve rotates CCW to position 1 (waste)
The syringe expels its full volume
Step 10 is shown in FIG. 8J and indicates that:
Rotary valve rotates CW to position 5 (Feed Reservoir)
The syringe draws in the feed sample Step 11 is shown in FIG. 8K and indicates that:
The Feed Fluid Sensor sees no fluid
The syringe draws and additional 10 mL of air
Step 12 is shown in FIG. 8L and indicates that:
The rotary valve rotates CCW to position 4 (blocked)
The syringe draws full volume
Step 13 is shown in FIG. 8M and indicates that:
The rotary valve rotates CCW to position 3 (Cell inlet)
The syringe starts driving the feed sample at the pressure setpoint
Step 14 is shown in FIG. 8N and indicates that:
The Inlet Fluid Sensor sees no fluid
The first stage locks up and the syringe must stop to prevent exceeding the pressure setpoint
Step 15 is shown in FIG. 8O and indicates that:
As each stage locks up, the Bypass valve for that stage is opened allowing air to pass around the filter
Step 16 is shown in FIG. 8P and indicates that:
After the final Filter Bypass valve has been opened, the pressure will drop rapidly to ambient
The syringe continues its stroke to expel its full volume
Step 17 is shown in FIG. 8Q and indicates that:
The syringe completes its stroke
All of the Bypass valves close
The Feed/Perm Iso. valves close
The Isolation valves open
Step 18 is shown in FIG. 8R and indicates that:
The Foam Valve pulses to elute the cell
Step 19 is shown in FIG. 8S and indicates that:
The Gas Valve pulses to push out the remaining foam
The user is prompted: "Elute again" or "Complete run"
 If "Elute again"; repeat steps 18 and 19
 If "Complete run"; continue to step 20
Step 1 is shown in FIG. 8A and indicates that:
Step 20 is shown in FIG. 8T and indicates that:
The following valves change position simultaneously:
 The Isolation Valves close
 The Filter Bypass Valves 1-5 open
 The Feed/Perm Iso. Valves open
 The Humic Stage Iso. Valves open
After a short pause, the syringe draws its full volume
Step 21 is shown in FIG. 8U and indicates that:
The rotary valve rotates CCW to position 1 (waste)
The Feed/Perm Iso. Valves close
The Filter Bypass Valves 1-5 close
The syringe expels it's full volume
Step 22 is shown in FIG. 8V and indicates that:
The rotary valve rotates CW to position 6 (NaOH reservoir)
The syringe draws 4 mL
Step 23 is shown in FIG. 8W and indicates that:
The rotary valve rotates CCW to position 2 (NaOH inlet)
The syringe slowly pushes the NaOH into the cell (~6 mL/min)
3 mL of the fluid fills the inside of the cell, while the additional 1 mL back flushes the humic stage and goes to waste
Step 24 is shown in FIG. 8X and indicates that:
The Humic Stage Iso. Valves close
The rotary valve rotates CCW to position 1 (waste)
The system resets The foam extraction process is summarized below. Sample extraction can be performed into a small volume using foam made from the extraction surfactant. This procedure cleans the concentrator, while simultaneously enhancing extraction efficiency and allowing for greatly reduced retentate volumes. A small volume of liquid can be used to create a large volume of foam. Since the boundaries of the bubbles present in the foam must remain intact to remain a foam, the boundaries of the bubbles at the interface of the filter and the extraction foam must always be touching. As the foam sweeps tangentially across the surface of the filters, it sweeps the concentrate through the device. When the foam is extracted from the device and collapses, the remaining product is a small volume of liquid. This volume can be in a range of less than 5 microliters to 1 milliliter. In its simplest form, the foam may be made in a separate container, and then injected to sweep the sample from the concentrator into the sample collection port. However, the use of a sample loop to measure the amount of liquid used to make the foam is preferred in order to generate samples of consistent size. In addition to surfactant foams that are generated by mixing air and a surfactant solution the foam may also be generated with a carbonated surfactant solution. Following carbonation, the solution is agitated by dispensing through an orifice, frit, filter, or capillary tube. The surfactant foam extraction methods described here can also be used for extraction and cleaning of other collection surfaces in aerosol samplers and collectors. The use of foam to extract these surfaces can provide a significant increase in extraction efficiency and significant decrease in final sample volume. Foam made using pressurized carbon dioxide has been shown in our experiments to be compatible with collection of viable *Bacillus atrophaeus* spores. A US Army Natick Research and Development Engineering Center report, Natick/TR-94/019, also indicates that *Bacillus stereothermophilus* spore suspensions in buffered carbonated solutions were not harmed, but that germination was inhibited. This inhibition was reversed upon plating for enumeration. It is also known that carbon dioxide inhibits the growth of many microorganisms. This fact has been exploited in preventing bacterial food spoilage in food by using modified atmosphere packing (MAP, e.g., Baker, R. C., et. al., 1986, Effect of an elevated level of carbon dioxide containing atmosphere on the growth of spoilage and pathogenic bacteria at 2, 5, and 13 C. Poult. Sci. 65: 729-737). The inventors believe, based on data contained in the referenced report, that storage of the extraction buffer under carbon dioxide pressure will preserve the extraction fluid from growth of contaminants. Further, since the foam generation method is driven by the evolution of gas from the dissolved state in the surfactant extraction fluid, it continues to generate new bubbles as old bubbles burst during passage though the fiber. The energy of the bursting bubbles assists in extracting particles from the fiber filter into the reduced-volume sample. The majority of the bubbles in the extraction foam burst soon after release from the extraction cell, resulting in a much smaller volume sample, which is essentially liquid in nature.

This application further incorporates by reference herein in their entirety all of the following applicant-owned applications, which disclose various techniques of foam elution, as discussed in the present disclosure: Ser. Nos. 13/368,197; 12/814,993; 12/882,188; 12/883,137; 13/028,897. Such techniques are incorporated by reference in this application.

The foregoing disclosure of the exemplary embodiments of the present subject disclosure has been presented for purposes of illustration and description. It is not intended to be exhaustive or to limit the subject disclosure to the precise forms disclosed. Many variations and modifications of the embodiments described herein will be apparent to one of ordinary skill in the art in light of the above disclosure. The scope of the subject disclosure is to be defined only by the claims appended hereto, and by their equivalents.

Further, in describing representative embodiments of the present subject disclosure, the specification may have presented the method and/or process of the present subject disclosure as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present subject disclosure should not be limited to the performance of their steps in the order written, and one skilled in the art can readily appreciate that the sequences may be varied and still remain within the spirit and scope of the present subject disclosure.

What is claimed is:

1. A device for fractionation and concentration of particles from a fluid sample, the device comprising:
a cartridge containing an inlet port and an outlet port and having alternating layers of plastic spacers and filters positioned serially between the inlet port and outlet port, wherein the inlet port, filters, and outlet port are positioned along a longitudinal axis, the longitudinal axis being perpendicular to the filters, each of the filters having a porous surface with all pores on a given filter being of a constant size, wherein the filters are arranged in series of decreasing pore size for capture of particles from a fluid sample, the alternating layers of plastic spacers and filters creating a plurality of internal volume chambers adjacent each porous surface, wherein the cartridge is adapted to direct a fluid sample flow in a substantially unidirectional manner along the longitudinal axis in each chamber, into the inlet port, perpendicularly through the decreasing pore size filters, and out of the outlet port, in a single pass, such that all of the fluid sample that entered into the inlet port passes through the outlet port while the particles are retained at a given filter according to particle size and do not pass to a subsequent filter if they are larger than the pore size of the given filter;
a permeate pressure source in fluid communication with the cartridge; and
a foam injection port at each end of the plurality of internal volume chambers and a retentate port at each opposite end of the plurality of internal volume chambers;
wherein the particles are eluted tangentially from said each porous surface by foam injected by the foam injecting port and collected through the retentate port, and dispensed in a reduced fluid volume.

2. The device in claim 1, further comprising a connecting portion for connection to a concentrating unit.

3. The device in claim 1, wherein the filters are separated by a small interstitial space.

4. The device in claim 1, wherein the filters are separated by a filter support with flow channel connecting the permeate of one filter with the retentate of an adjacent smaller pore filter.

5. The device in claim 1, wherein a sample is introduced into the device perpendicular to a surface of each filter.

6. The device in claim 1, wherein valved fluidic connections connect the internal volume between each of the filters.

7. The device in claim 1, wherein pneumatic, hydraulic, or mechanical valves are integrated into the cartridge device.

8. The device in claim 1, wherein the filters are one or more of a flat membrane filter, a flat ceramic filter, an affinity-based filter, a flat depth filter, an electrostatically charged filter, or a microsieve.

9. The device in claim 1, further comprising an elution buffer distribution manifold including flow control orifice.

\* \* \* \* \*